(12) United States Patent
Fujii et al.

(10) Patent No.: US 6,285,461 B1
(45) Date of Patent: Sep. 4, 2001

(54) IMAGE OUTPUT SYSTEM HAVING PREVIEW FUNCTION AND METHOD OF DISPLAYING PREVIEW IMAGE IN IMAGE OUTPUT SYSTEM

(75) Inventors: Norihisa Fujii; Atsuhiko Kurachi, both of Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/063,488

(22) Filed: Apr. 21, 1998

(30) Foreign Application Priority Data

Apr. 24, 1997 (JP) .................................................. 9-107941
Apr. 25, 1997 (JP) .................................................. 9-109879

(51) Int. Cl.[7] .............................. B41B 15/00; B41J 15/00; G03F 3/10
(52) U.S. Cl. ........................ 358/1.18; 358/1.17; 358/1.16; 358/1.15; 358/1.14; 358/1.13; 358/527
(58) Field of Search .................................... 358/527, 515, 358/501, 500, 1.18, 1.9, 1.11, 1.12, 1.13–1.17; 348/488

(56) References Cited

U.S. PATENT DOCUMENTS 5,666,471 9/1997 Fujii .
5,914,793 * 6/1999 Suzuki et al. .......................... 358/527
5,963,216 * 10/1999 Chirabini et al. ...................... 358/1.9

FOREIGN PATENT DOCUMENTS 7-40608 2/1995 (JP) .
8-30410 2/1996 (JP) .

* cited by examiner

*Primary Examiner*—Edward Coles
*Assistant Examiner*—Twyler Lamb
(74) *Attorney, Agent, or Firm*—Oliff & Berridge, PLC.

(57) ABSTRACT

An image output system having a preview function for displaying a preview image corresponding to an output image before the output image is outputted, the image output system having: an output data generating apparatus having: an output data generating device for generating output data; an output data sending device for sending the generated output data to a converting apparatus; a preview data receiving device for receiving preview data from the converting apparatus; and a display device for displaying a preview image made from the received preview data, the converting apparatus having: an output data receiving device for receiving the output data from the output data generating apparatus; a converting device for converting the received output data into data suitable for an output apparatus by using converting data which includes predetermined data necessary to a process for converting; a preview data generating device for generating the preview data by using the received output data and the converting data; and a preview data sending device for sending the generated preview data to the output data generating apparatus, and the output apparatus for outputting the output image made from the output data converted by the converting apparatus.

22 Claims, 16 Drawing Sheets

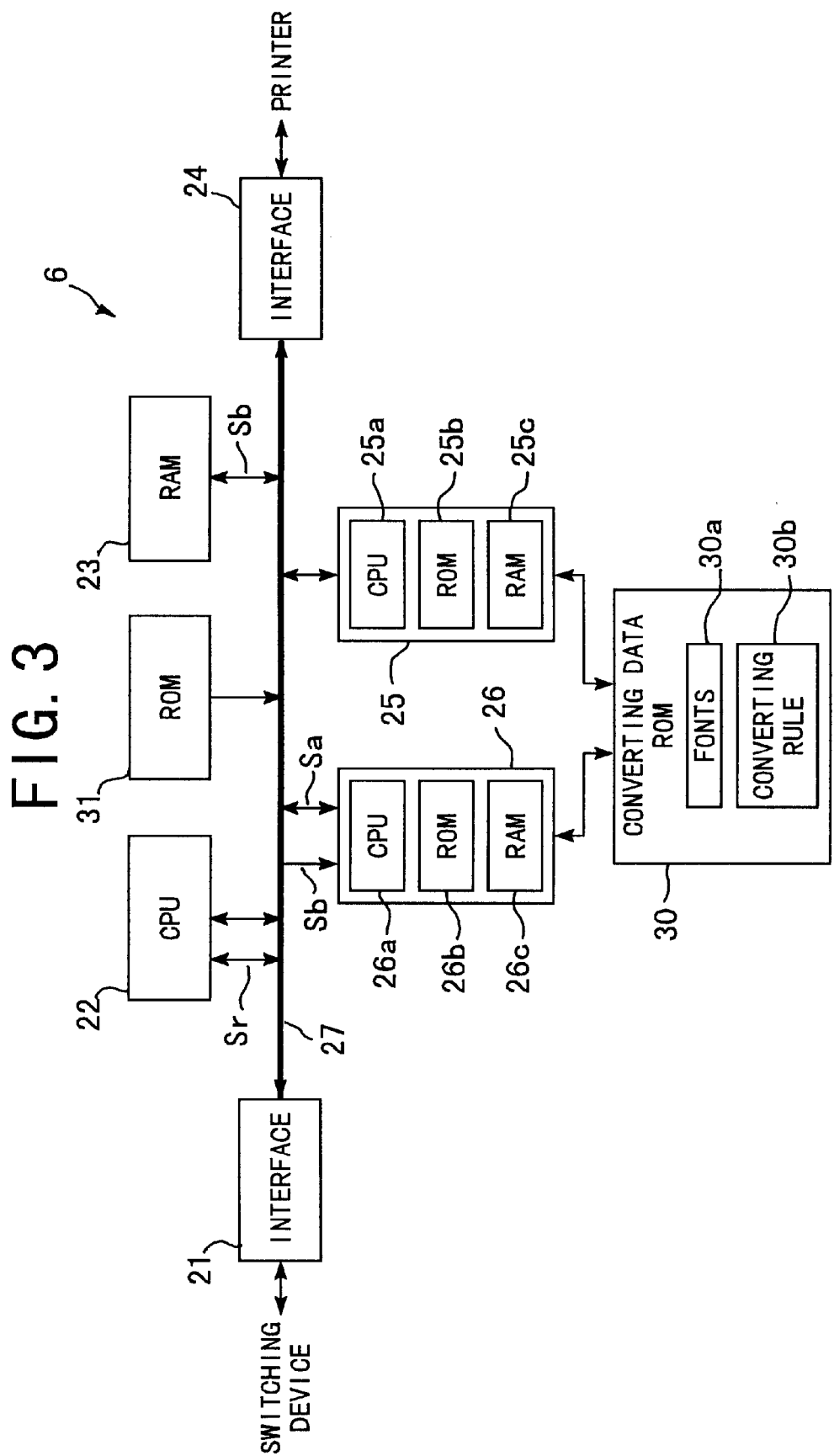

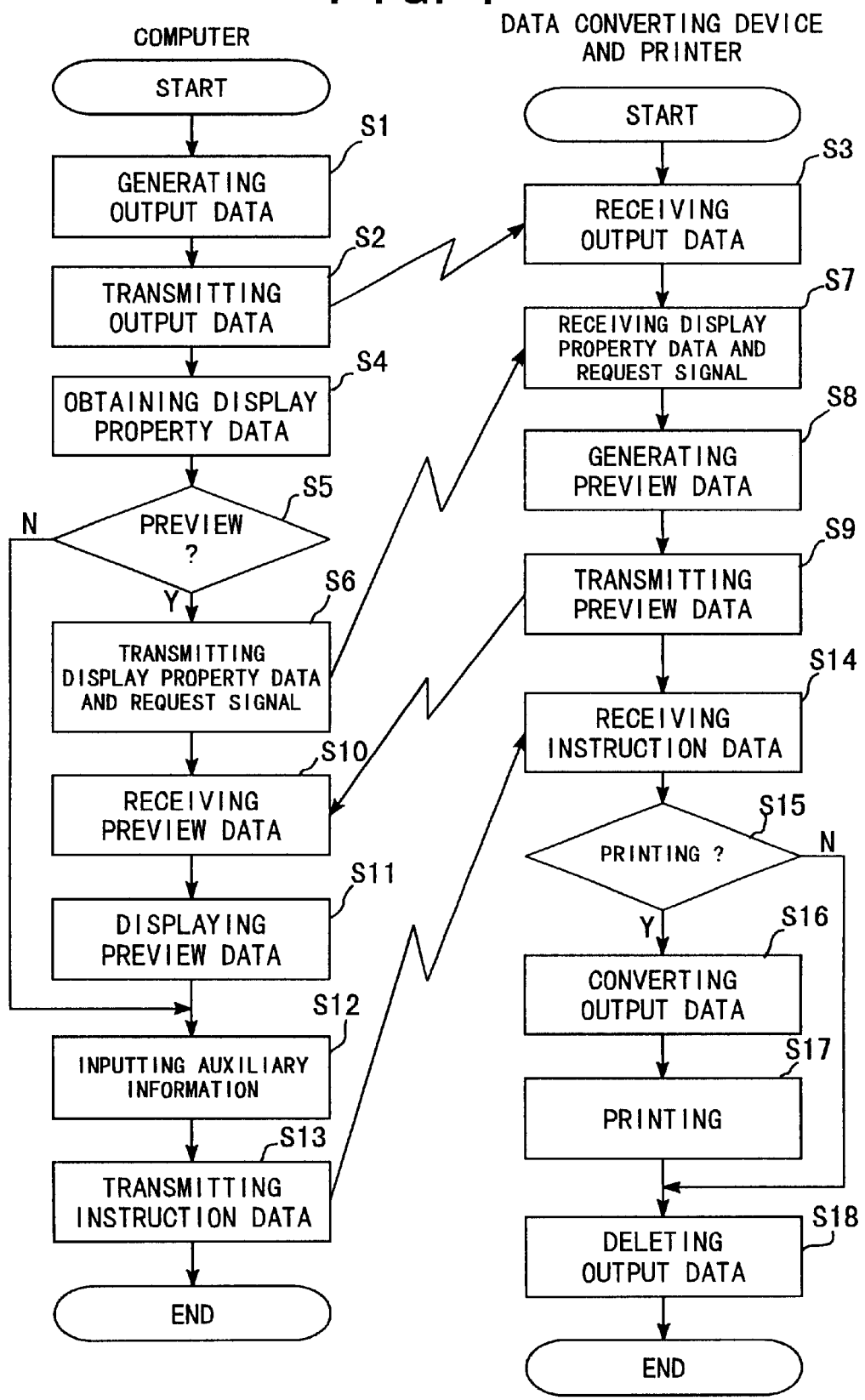

FIG. 5A

GET<SP><PREVIEW GENERATING COMMAND URL>?<RESOLUTION>%<THE NUMBER OF COLOR>%<SIZE><SP>HTTP/1.1<CR>

FIG. 5B

<PREVIEW GENERATING COMMAND URL> = HTTP://www.printserv1.sample.co.jp/preview/getpreview.exe
<RESOLUTION> = 120 dpi
<THE NUMBER OF COLOR> = 256
<SIZE> = 32, 32

FIG. 5C

GET HTTP://www.printserv1.sample.co.jp/preview/getpreview.exe?120dpi%256%32,32 HTTP/1.1<CRLF>

FIG. 6

| | DISPLAY PROPERTY DATA | PREVIEW DATA |
|---|---|---|
| COMPUTER 1 | RESOLUTION: 120 dpi<br>THE NUMBER OF COLOR: 8 bit Index Color<br>PREVIEW SIZE: 50×50 mm | 236×236 pixels<br>256 colors |
| COMPUTER 2 | RESOLUTION: 72 dpi<br>THE NUMBER OF COLOR: RGB<br>(each color is 8 bit)<br>PREVIEW SIZE: 65×65 mm | 184×184 pixels<br>16777216 colors |
| COMPUTER 3 | RESOLUTION: 120 dpi<br>THE NUMBER OF COLOR: RGB<br>(each color is 5 bit)<br>PREVIEW SIZE: 50×50 mm | 236×236 pixels<br>32768 colors |

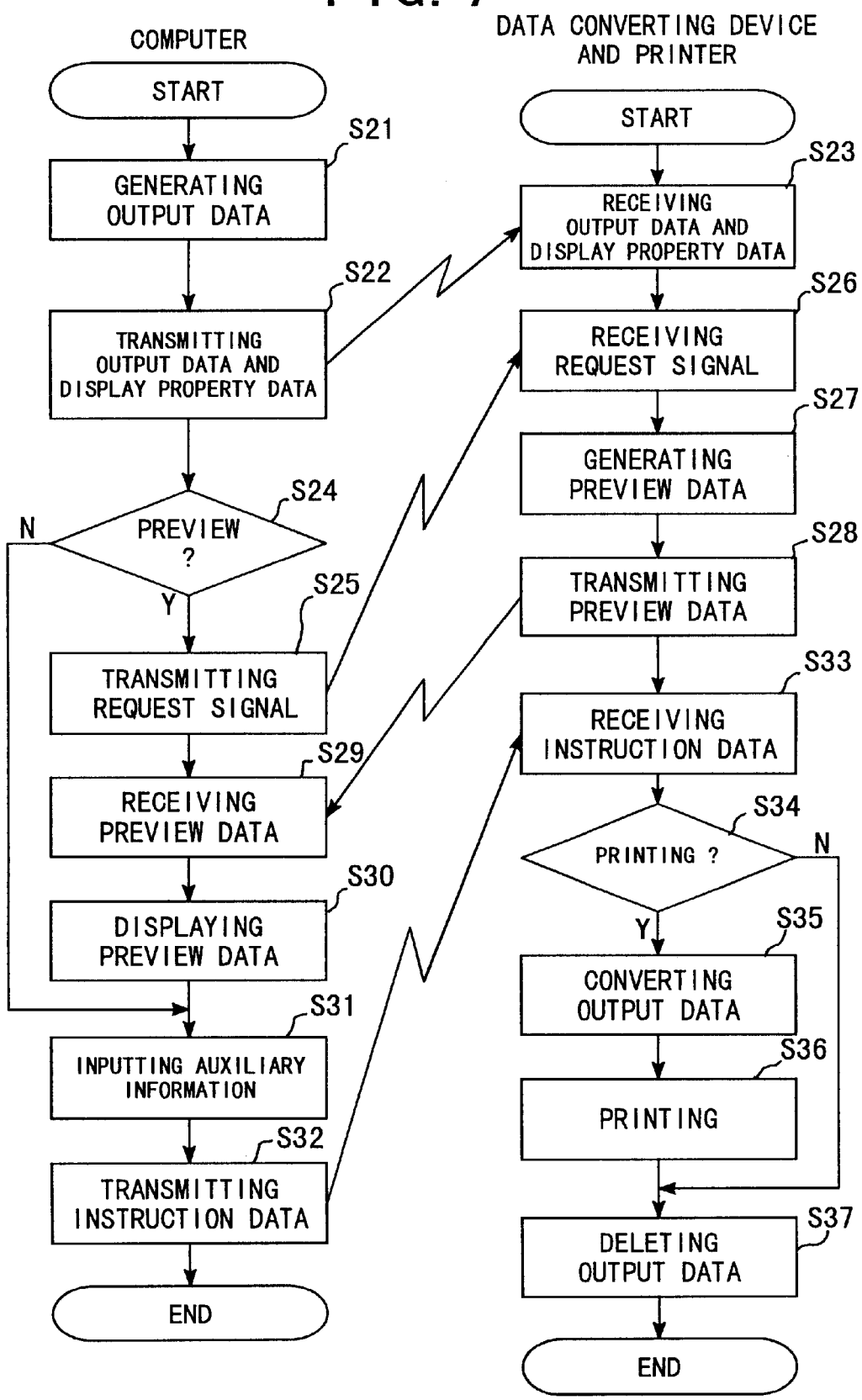

FIG. 8A

%//PC-Display-dpi:<RESOLUTION>
%//PC-Color-Type:<FLAG indicating Index Color or RGB Color>
%//PC-Colors:<THE NUMBER OF COLOR>
%//PC-Preview-Size:<SIZE DATA>

FIG. 8B

%!PS-Adobe-3.0
%%Title: XXXX
%%Creator: PSCRIPT.DRV Version 4.0
%%CreationDate: 03/21/97 09:02:32

. . . . . . . .

%//PC-Display-dpi:120
%//PC-Color-Type:RGB
%//PC-Colors:32768
%//PC-Preview-Size:50,50mm

. . . . . . . .

%%EndComments

. . . . . . . .

IMAGE OUTPUT SYSTEM HAVING PREVIEW FUNCTION AND METHOD OF DISPLAYING PREVIEW IMAGE IN IMAGE OUTPUT SYSTEM

BACKGROUND OF THE INVENTION

1. Field of the Invention

The present invention relates to a preview function which makes it possible to confirm an image corresponding to image data by a data generating apparatus, such as a computer, before an image made from the image data is actually outputted from an output apparatus, such as a printer, connected with the data generating apparatus.

2. Description of the Related Art

In a case that image data is generated by a computer and an image made from the image data is printed out by a printer connected with the computer, an image corresponding to the image data is previewed in order to confirm the image before the image is actually printed out.

Namely, the image data generated by the computer is outputted from the computer to the printer at first. The image data is described by using a page description language, for example. Next, in the printer, the image data is converted into bitmap data. Further, the bitmap data is supplied to a print engine, and an image made from the bitmap data is printed out by the print engine.

At this time, there is a case that an actual image printed out by the printer is different from an image which a user has desired. In order to prevent such an incorrect image from printing out by the printer, it is necessary to confirm the image corresponding to image data by the computer before the image is actually printed out by the printer. For such a reason, the computer has a preview function which makes it possible to confirm the image corresponding to the image data by a display. In the computer having the preview function, the image to be previewed on the display, i.e., the preview image is made by using font data, etc. stored in the computer itself.

Further, trimming, tiling, color correction and a change of size are carried out on the basis of the preview image displayed on the display of the computer.

Trimming is a process to delete a peripheral portion of the image before printing. When the trimming is carried out, a user decides a peripheral portion on the basis of the preview image displayed on the display of the computer.

Tiling is a process to divide the image into plural parts when the size of the image exceeds the size of the printing paper. When the tiling is carried out, a user decides a position of a dividing line on the basis of the preview image displayed on the display of the computer.

Color correction is a process to correct colors of the image in order to equalize colors of the image to a desired colors. When the color correction is carried out, a user decides colors on the basis of the preview image displayed on the display of the computer.

A change of size is carried out in a case that it is necessary to change a size of the image at the time of printing. At this time, a user decides a size of the image on the basis of the preview image displayed on the display of the computer.

Here, in case that one printer is shared with a plurality of computers by using a network or the like, various types of computers are connected with one printer through the network. If font data stored in one of the computers connected with the printer is different from that stored in the printer, and if a program (to be used for converting image data in order to produce an image) installed in one of the computers connected with the printer is different from that installed in the printer, it is not possible to display a preview image equal or similar to an actual image printed by the printer. If the font data equal to that stored in the printer is installed in all of the computers connected with the printer, it may be possible to display a preview image equal or similar to an actual printed image at each computer. But, actually, this is difficult and troublesome.

Further, if a preview image is different from an actual image printed by a printer, trimming, tiling, color correction and a change of size cannot be correctly carried out on the basis of the preview image displayed on a display of each computer.

In order to display a preview image equal or similar to an actual image printed by a printer, it is proposed that bitmap data converted by the printer is used for the preview. Namely, at first, image data described by the page description language is sent to the printer from each computer. Next, the sent image data is converted into binary bitmap data having low graduation in the printer. Thereafter, the bitmap data is thinned out in the printer in order to match the bitmap data to a resolution of the display of each computer. Further, the thinned out bitmap data is sent to each computer from the printer as preview data. Thus, an preview image made from the preview data is displayed on the display of each computer.

However, if the bitmap data is simply thinned out, the preview image displayed on the display is unclear or broken due to a quantization difference between each computer and the printer. For instance, lines forming the preview image are partially disappeared, an edge of the preview image becomes unclear, or an irregular color, such as moire, is occurred in the preview image. These facts are especially serious problem in color printing.

Namely, in a printing system used in a laser printer, an inkjet printer or the like, an image printed by such a printer is constructed by a plurality of dots. The dot is a smallest part of a printed image. An image is formed by an on/off of each dot. In this case, bitmap data corresponds to each dot of an image. Namely, the bitmap data is data in which an on/off of each dot is recorded. Thus, if the bitmap data is simply thinned out, the bitmap data is partially lost and lines forming the preview image are partially disappeared.

Further, in such a printing system, when an image having intermediate graduation is printed or displayed, a half tone screening technique or the like is used. In the half tone screening technique, a picture element is constructed by a plurality of dots. The concentration of a picture element is changed with the number of the dots being an on condition. In case that the half tone screening technique is used, bitmap data corresponds to each dot constructing each picture element. Therefore, if bitmap data is simply thinned out, the contours of the preview image is unclear.

Furthermore, an irregular color occurred in the preview image can be attributed to interference between a sampling frequency using quantization when an original image is converted to bitmap data and a sampling frequency using quantization when the bitmap data is further converted to the preview data. Concretely, some stripes formed by different concentrations are appeared in the preview image. This phenomenon is called moire.

On the other hand, in case that one printer is shared with a plurality of computers, each computer may have a display having a different resolution and the different number of colors. However, the conventional printer generates only one type of preview data. Namely, the conventional printer cannot generate preview data suitable for different resolution and different color (the number of color). As a result, it is impossible to display a correct preview image on the display of every computer connected with the printer.

SUMMARY OF THE INVENTION

It is therefore a first object of the present invention to provide an image output system having a preview function and a method of displaying a preview image in an image output system, wherein a preview image equal to or similar to an actual image outputted by an output apparatus can be displayed on a display apparatus Further, it is a second object of the present invention to provide an image output system having a preview function and a method of displaying a preview image in an image output system, wherein a preview data very suitable for a display property of a display apparatus can be produced so as to display the preview image clearly.

Furthermore, it is a third object of the present invention to provide an image output system having a preview function and a method of displaying a preview image in an image output system, which can accurately perform processes, such as trimming, tiling, color correction, a change of size, on the basis of a preview image displayed on a display apparatus.

According to the present invention, the above mentioned first object can be achieved by an image output system having a preview function for displaying a preview image corresponding to an output image before the output image is outputted, the image output system having: an output data generating apparatus having: an output data generating device for generating output data; an output data sending device for sending the generated output data to a converting apparatus; a preview data receiving device for receiving preview data from the converting apparatus; and a display device for displaying a preview image made from the received preview data, the converting apparatus having: an output data receiving device for receiving the output data from the output data generating apparatus; a converting device for converting the received output data into data suitable for an output apparatus by using converting data which includes predetermined data necessary to a process for converting; a preview data generating device for generating the preview data by using the received output data and the converting data; and a preview data sending device for sending the generated preview data to the output data generating apparatus, and the output apparatus for outputting the output image made from the output data converted by the converting apparatus.

Namely, the converting apparatus converts the output data into the data suitable for the output apparatus by using the converting data. Further, the converting apparatus generates the preview data by using the output data received from the output data generating apparatus and the converting data. The preview data is generated by using the same converting data as that used for converting the output data into the data suitable for the output apparatus. Therefore, the preview image made from the preview data is completely equal or similar to the output image made from the converted output data.

According to the present invention, the above mentioned second object can be achieved by the image output system, wherein the output data generating apparatus further has a display property data sending device for sending display property data of a display property of the display device to the converting apparatus, the converting apparatus further has a display property data receiving device for receiving the display property data from the output data generating apparatus, and the preview data generating device generates the preview data by using the output data, the converting data and the received display property data.

Thus, since the preview data is generated by using the output data, the converting data and the display property data, the preview data very suitable for the display property of the display device of the output data generating apparatus can be generated.

According to the present invention, the above mentioned third object can be achieved by the image output system, wherein the output data generating apparatus further has: a processing data generating device for generating processing data, which is used for processing the output data, on the basis of the received preview data; and a processing data sending device for sending the generated processing data to the converting device, the converting apparatus further has a processing data receiving device for receiving the processing data from the output data generating apparatus, and the converting device processes the received output data by using the received processing data and converts the processed output data into the data suitable for the output apparatus.

Namely, the processing data generating device generates the processing data on the basis of the received preview data. As mentioned above, the preview data is generated by using the same converting data as that used for converting the output data into the data suitable for the output apparatus, and therefore, the preview image made from the preview data is equal or similar to the output image made form the converted output data. Namely, on the basis of the preview data completely corresponding to the output data actually outputted from the output apparatus, the processing data is generated. Therefore, the output data is accurately processed by using the processing data in the converting device. Thus, processes, such as trimming, tiling, color correction, a change of size, etc. with respect the output image can be accurately performed.

According to the present invention, the above mentioned first object can be also achieved by a first method of displaying a preview image corresponding to an output image in an image output system comprising an output data generating apparatus for generating output data and for displaying the preview image on a display device, a converting apparatus for converting the output data into data suitable for an output apparatus by using converting data, which includes predetermined data necessary to a process for converting, and the output apparatus for outputting the output image made from the converted output data, said method having the processes of: generating the output data in the output data generating apparatus; sending the output data generated in the output data generating apparatus to the converting apparatus; receiving the output data from the output data generating apparatus in the converting apparatus; generating preview data by using the received output data and the converting data in the converting apparatus; sending the preview data generated in the converting apparatus to the output data generating apparatus; receiving the preview data from the converting apparatus in the output data generating apparatus; displaying the preview image made from the received preview data on the display device of the output data generating apparatus.

Namely, the converting apparatus converts the output data into the data suitable for the output apparatus by using the converting data. Further, the converting apparatus generates the preview data by using the output data received from the output data generating apparatus and the converting data. The preview data is generated by using the same converting data as that used for converting the output data into the data suitable for the output apparatus. Therefore, the preview image made from the preview data is completely equal or similar to the output image made from the converted output data.

According to the present invention, the above mentioned second object can be also achieved by a second method of displaying a preview image corresponding to an output image in an image output system comprising an output data generating apparatus for generating output data and for displaying the preview image on a display device, a converting apparatus for converting the output data into data suitable for an output apparatus by using converting data, which includes predetermined data necessary to a process for converting, and the output apparatus for outputting the output image made from the converted output data, said method having the processes of: generating the output data in the output data generating apparatus; sending the output data generated in the output data generating apparatus and display property data of a display property of the display device of the output data generating apparatus to the converting apparatus; receiving the output data and the display property data from the output data generating apparatus in the converting apparatus; generating preview data by using the received output data, the converting data and the received display property data in the converting apparatus; sending the preview data generated in the converting apparatus to the output data generating apparatus; receiving the preview data from the converting apparatus in the output data generating apparatus; displaying the preview image made from the received preview data on the display device of the output data generating apparatus.

Thus, since the preview data is generated by using the output data, the converting data and the display property data, the preview data very suitable for the display property of the display device of the output data generating apparatus can be generated.

According to the present invention, the above mentioned third object can be also achieved by the first method further having the processes of: generating processing data, which is used for processing the output data, on the basis of the received preview data in the output data generating apparatus, after the preview image is displayed in the displaying process; sending the processing data generated in the output data generating apparatus to the converting apparatus; receiving the processing data from the output data generating apparatus in the converting apparatus; processing the received output data by using the received processing data and converting the processed output data into the data suitable for the output apparatus in the converting apparatus; and outputting the converted output data in the output apparatus.

Namely, the output data generating apparatus generates the processing data on the basis of the received preview data. As mentioned above, the preview data is generated by using the same converting data as that used for converting the output data into the data suitable for the output apparatus, and therefore, the preview image made from the preview data is equal or similar to the output image made form the converted output data. Namely, on the basis of the preview data completely corresponding to the output data actually outputted from the output apparatus, the processing data is generated. Therefore, the output data is accurately processed by using the processing data in the converting apparatus. Thus, processes, such as trimming, tiling, color correction, a change of size, etc. with respect the output image can be accurately performed.

According to the present invention, the above first object can also be achieved by a first program storage device readable by a first computer included in an output data generating apparatus and a second computer included in a converting apparatus in an output image system having the output data generating apparatus for generating output data and for displaying a preview image on a display device, the converting apparatus for converting the output data into data suitable for an output apparatus by using converting data, which includes predetermined data necessary to a process for converting, and the output apparatus for outputting an output image made from the converted output data, tangibly embodying a program of instructions executable by the first computer and the second computer to perform method processes for displaying the preview image corresponding to the output image in the image output system, the method processes having: generating the output data in the output data generating apparatus; sending the output data generated in the output data generating apparatus to the converting apparatus; receiving the output data from the output data generating apparatus in the converting apparatus; generating preview data by using the received output data and the converting data in the converting apparatus; sending the preview data generated in the converting apparatus to the output data generating apparatus; receiving the preview data from the converting apparatus in the output data generating apparatus; and displaying the preview image made from the received preview data on the display device of the output data generating apparatus.

Namely, the converting apparatus converts the output data into the data suitable for the output apparatus by using the converting data. Further, the converting apparatus generates the preview data by using the output data received from the output data generating apparatus and the converting data. The preview data is generated by using the same converting data as that used for converting the output data into the data suitable for the output apparatus. Therefore, the preview image made from the preview data is completely equal or similar to the output image made from the converted output data.

According to the present invention, the above second object can be also achieved by a second program storage device readably by a first computer included in an output data generating apparatus and a second computer included in a converting apparatus in an output image system having the output data generating apparatus for generating output data and for displaying a preview image on a display device, the converting apparatus for converting the output data into data suitable for an output apparatus by using converting data, which includes predetermined data necessary to a process for converting, and the output apparatus for outputting an output image made from the converted output data, tangibly embodying a program of instructions executable by the first computer and the second computer to perform method processes for displaying the preview image corresponding to the output image in the image output system, the method processes having: generating the output data in the output data generating apparatus; sending the output data generated in the output data generating apparatus and display property data of a display property of the display device of the output data generating apparatus to the converting apparatus; receiving the output data and the display property data from the output data generating apparatus in the converting apparatus; generating preview data by using the received output data, the converting data and the received display property data in the converting apparatus; sending the preview data generated in the converting apparatus to the output data generating apparatus; receiving the preview data from the converting apparatus in the output data generating apparatus; and displaying the preview image made from the received preview data on the display device of the output data generating apparatus.

Thus, since the preview data is generated by using the output data, the converting data and the display property data, the preview data very suitable for the display property of the display device of the output data generating apparatus can be generated.

According to the present invention, the above third object can be also achieved by the first program storage device, wherein the method processes further have: generating processing data, which is used for processing the output data, on the basis of the received preview data in the output data generating apparatus after displaying process in the output data generating apparatus; sending the processing data generated in the output data generating apparatus to the converting apparatus; receiving the processing data from the output data generating apparatus in the converting apparatus; processing the received output data by using the received processing data and converting the processed output data into the data suitable for the output apparatus in the converting apparatus; and outputting the converted output data in the output apparatus.

Namely, the output data generating apparatus generates the processing data on the basis of the received preview data. As mentioned above, the preview data is generated by using the same converting data as that used for converting the output data into the data suitable for the output apparatus, and therefore, the preview image made from the preview data is equal or similar to the output image made form the converted output data. Namely, on the basis of the preview data completely corresponding to the output data actually outputted from the output apparatus, the processing data is generated. Therefore, the output data is accurately processed by using the processing data in the converting apparatus. Thus, processes, such as trimming, tiling, color correction, a change of size, etc. with respect the output image can be accurately performed.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 3 is a block diagram showing a configuration of a data converting device according to the first embodiment of the present invention;

FIG. 4 is a flowchart showing a preview process according to the first embodiment of the present invention;

FIGS. 5A to 5C are diagrams showing examples of a request signal and display property data according to the first embodiment of the present invention;

FIG. 6 is a diagram showing examples of display property data and preview images corresponding to the display property according to the first embodiment of the present invention;

FIG. 7 is a flowchart showing a preview process according to a second embodiment of the present invention;

FIGS. 8A and 8B is a diagram showing an example of display property data and output data corresponding to the display property data according to the second embodiment of the present invention;

DETAILED DESCRIPTION OF THE PREFERRED EMBODIMENTS

Referring to accompanying drawings, an embodiment of the present invention will be now explained.

I. First Embodiment

Firstly, a first embodiment of the present invention will be explained.

(i) Outline of Network System

Figure 1:
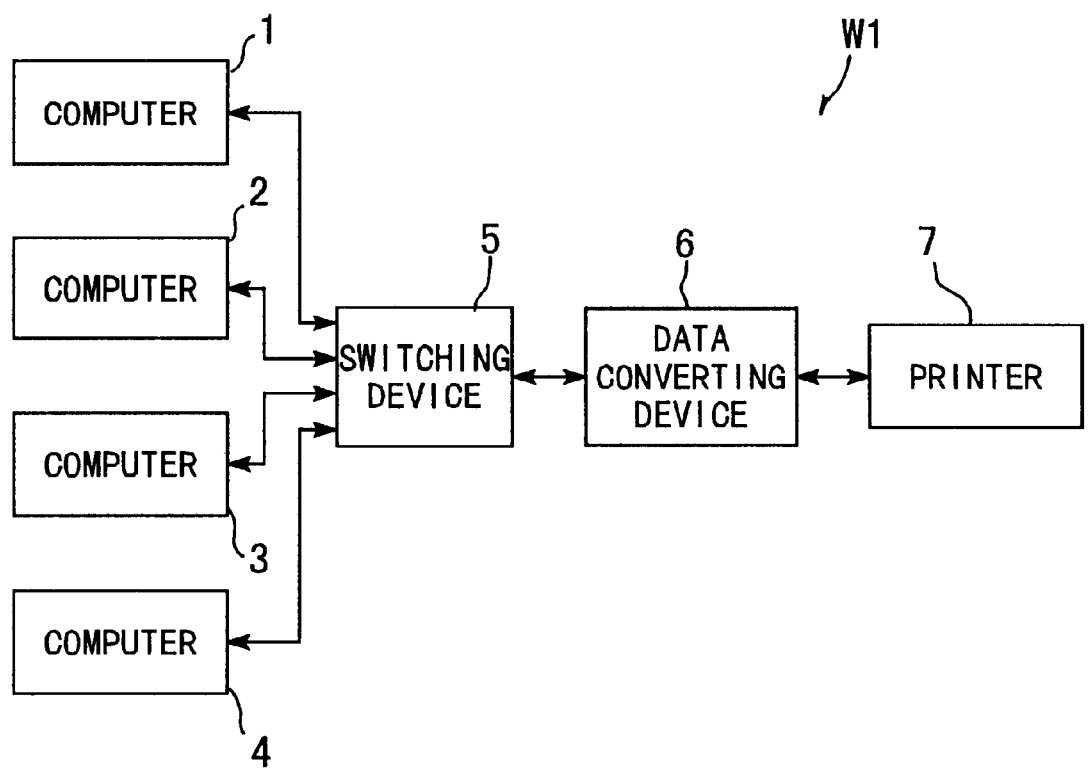
FIG. 1 is a block diagram showing a configuration of a network system of a first embodiment of the present invention.

FIG. 1 shows a configuration of a network system W1 of the first embodiment. The network system W1 has four computers 1 to 4, a data converting device 6, a switching device 5 and a printer 7. Each computer 1 to 4 is connected with the data converting device 6 through the switching device 5, and the data converting device 6 is connected with the printer 7.

Each computer 1 to 4 generates output data Sb by using an application software, etc. in order to print out an image by the printer 7, and outputs the output data Sb. Further, each computer 1 to 4 carries out a preview process together with the data converting device 6 and the printer 7. In addition, the output data Sb is generated by using a page description language, such as "PostScript" made by Adobe Systems Incorporated.

Here, the preview process is a process to display an image corresponding to the output data Sb on a display installed in or connected with each computer 1 to 4 in order to confirm contents of the image, such as fonts, relative size of characters, a whole layout, positions of color and the like before the image is actually printed out by the printer 7.

The switching device 5 has a buffer for storing temporarily the output data Sb outputted from each computer 1 to 4, and outputs the stored output data Sb to the converting device 6 by a time sharing for each computer.

Further, the switching device 5 delivers preview data Sa, which is supplied from the data converting device 6, to each computer 1 to 4.

The data converting device 6 receives the output data Sb supplied from each computer 1 to 4 through the switching device 5, converts the received output data Sb into print data of a bitmap format by using converting data installed in the data converting device 6, and outputs the print data to the printer 7. Further, the data converting device 6 carries out the preview process together with the computers 1 to 4 and the printer 7.

The printer 7 prints out an image made from the print data outputted from the data converting device 6. Thus, the image corresponding to the output data Sb is printed out.

(ii) Details of Network System

Figure 2A:
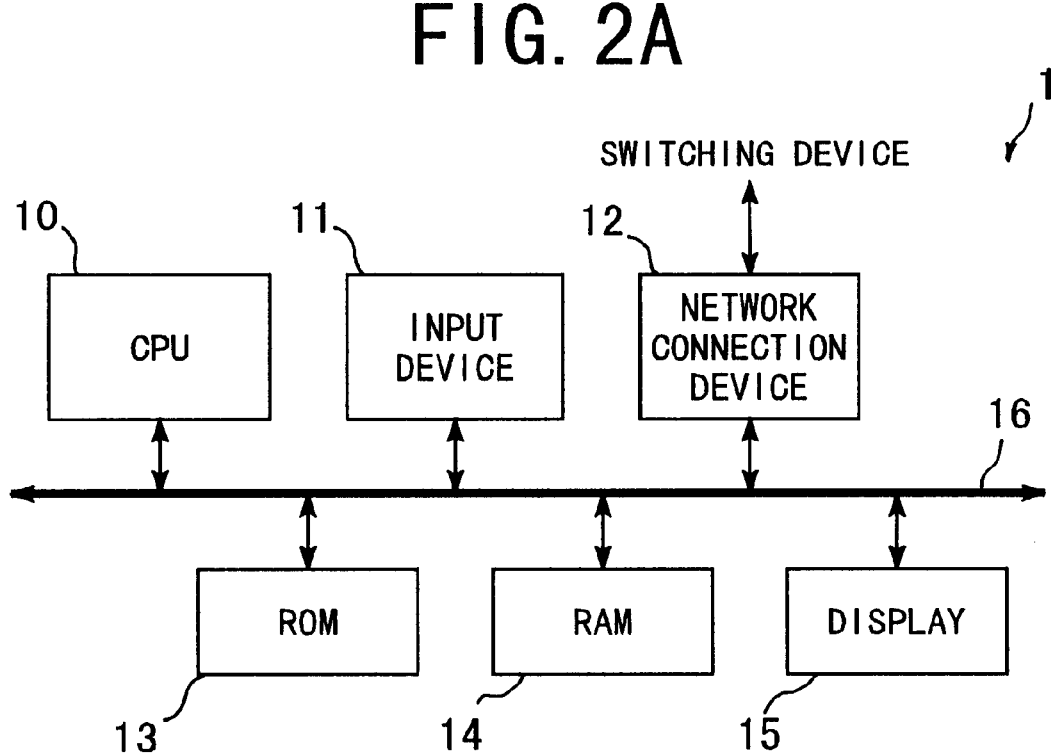
FIG. 2A is a block diagram showing a configuration of a computer according to the first embodiment of the present invention.

FIG. 2A shows the configuration of each computer 1 to 4. As each computer 1 to 4 has the same configuration, the configuration and the operation of the computer 1 will be explained.

As shown in FIG. 2, the computer 1 has a CPU 10, an input device 11, a network connection device 12, a ROM (Read Only Memory) 13, RAM (Random Access Memory) 14, a display 15. Theses devices are connected with each other through a bus 16.

The network connection device 12 performs as an interface between the computer 1 and the switching device 5. Data is outputted from or inputted to the computer 1 through the network connection device 12.

The input device 11 has a keyboard, a mouse and the like. The input device 11 receives data inputted from the external, and supplies the input data to the CPU 10, etc. though the bus 16.

The ROM 13 is a memory for storing programs for carrying out the preview process and programs for controlling the computer 1. The ROM 13 outputs stored programs to the bus 16 under a control of the CPU 10, etc.

The RAM 14 is a memory for storing temporarily data necessary to the CPU 10. The RAM 14 outputs the stored data to the bus 16 under a control of the CPU 10. In addition, a hard disc may be used as the RAM 14.

The display 15 is a CRT (Cathode Ray Tube) display, a liquid crystal display or the like, and displays data and instructions necessary to the operation of the computer 1. Further, the display 15 displays a preview image made from the preview data Sa.

The CPU 10 performs word processing, picture processing, control of computer 1, etc. in accordance with the programs stored in the ROM 13 and the application program stored in the RAM 14.

Figure 2B:
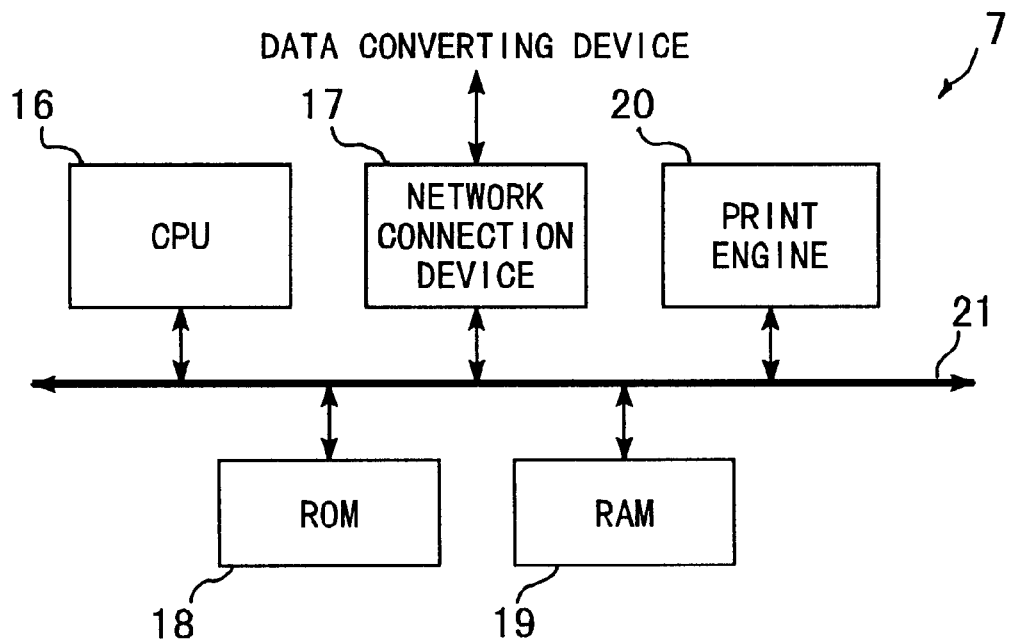
FIG. 2B is a block diagram showing a configuration of a printer according to the first embodiment of the present invention.

Next, FIG. 2B shows the configuration of the printer 7. The printer 7 has a CPU 16, a network connection device 17, a ROM 18, a RAM 19 and a print engine 20. These devices are connected with each other through a bus 21.

The network connection device 17 performs as an interface between the printer 7 and the data converting device 6. Namely, the network connection device 17 is connected with the data converting device 6, and the print data outputted from the data converting device 6 is inputted into the printer 7 though the network connection device 17.

The CPU 16 controls the devices installed in the printer 7 and mainly performs a control of printing the print data.

The ROM 18 is a memory for storing control programs necessary to the operation of the CPU 16. The control programs stored in the ROM 18 are outputted to the bus 21 under a control of the CPU 16.

The RAM 19 is a memory for storing temporarily data necessary to the operation of the CPU 16. The data stored in the RAM 19 are outputted to the bus 21 under a control of the CPU 16.

The print engine 20 has a printing device of an inkjet type or a laser beam type, and performs the actual printing operation under a control of the CPU 16.

Next, FIG. 3 shows the configuration of the data converting device 6. The data converting device 6 has interfaces 21 and 24, a CPU 22, a ROM 31, a RAM 23, a bitmap data generating portion 25, a preview data generating portion 26, a converting data ROM 30. These devices and portions are connected with each other though a bus 27.

Further, the bitmap generating portion 25 has a logic operation circuit having a CPU 25$a$, a ROM 25$b$ and a RAM 25$c$, and the preview data generating portion 26 has a logic operation circuit having a CPU 26$a$, a ROM 26$b$ and a RAM 26$c$. Furthermore, programs used for generating the print data are stored in the ROM 25$b$, and programs used for setting the operation of the CPU 26$a$ are stored in the ROM 26$b$.

The CPU 22 controls the devices and portions installed in the data converting device 6, and outputs the preview data Sa to each computers 1 to 4 though the switching device 5.

The RAM 23 temporarily stores the output data Sb, etc. inputted from each computers 1 to 4, and outputs them under a control of the CPU 22. Further, the RAM 23 temporarily stores the print data generated in the bitmap data generating portion 25, and outputs them to the printer though the bus 27 under a control of the CPU 22. Furthermore, the RAM 23 temporarily stores the preview data Sa generated in the preview data generating portion 26, and outputs them to each computers 1 to 4 though the bus 27 under a control of the CPU 22.

The ROM 31 is a memory for storing control programs for controlling the devices and portions installed in the data converting device 6. The control programs stored in the ROM 31 are outputted to the bus 27 under a control of the CPU 22, etc.

The converting data ROM 30 is a memory for storing the converting data. The converting data is used for converting the output data Sb described by the data description language into the print data of the bitmap format. The converting data is used in the bitmap data generating portion 25 and the preview data generating portion 26. The converting data has font data 30$a$ corresponding to characters included in output data described by using the page description language and converting rule data 30$b$ for interpreting command codes included in the output data described by using the page description language.

The bitmap data generating portion 25 converts the output data Sb supplied from each computer 1 to 4 into the print data of the bitmap format, and outputs the print data to the RAM 23. Namely, the bitmap data generating portion 25 reads out commands code and characters from the output data Sb, and reads out the converting rule data 30$b$ and the font data 30$a$ corresponding to the command codes and the characters from the converting data ROM 30. Further the data generating portion 25 generates the print data of the bitmap format to print figures corresponding to the command codes and fonts corresponding to the characters, and stores the print data into the RAM 23.

In addition, in the bitmap data generation device 25, the print data is generated for each page to be actually printed out by using the aforementioned converting data, which includes fonts actually used for printing by the printer 7.

The interface 24 performs as an interface to output the generated print data to the printer 7.

The preview data generating portion 26 generates the preview data Sa to be used for the preview process by using the output data Sb, the converting data and display property data Sd in response to request signal Sr sent from each computer 1 to 4, and outputs the preview data Sa to the RAM 23. The preview data generating portion 26 generates the preview data Sa by using the same converting data and the same process as that used for generating the print data. Therefore, the preview data Sa accurately corresponds to the actual image (figures and fonts of the actual image) printed by the printer 7. Further, the preview data generating portion 26 generates the preview data Sa by using the display property data Sd sent from each computer 1 to 4. Therefore, it is possible to generate the preview data Sa very suitable for the display 15 installed in or connected with each computer 1 to 4.

In addition, in case that each computer 1 to 4 has the same display 15, the display property data Sd sent from each computer 1 to 4 may not be used for generating the preview data Sa. Namely, in this case, one kind of property of the display 15 may be stored in the preview data generating portion 26, etc. in advance as fixed parameters, and the preview data Sa may be generated by using the output data Sb, the converting data and these parameters. On the other hand, in case that each computer 1 to 4 has a different display 15, the display property data Sd sent from each computer 1 to 4 is used for generating the preview data Sa.

(iii) Preview Process

FIG. 4 is a flowchart showing the preview process in the computer 1, the data converting device 6 and the printer 7. In addition, the preview process in the each of the computers 2 to 3, the data converting device 6 and the printer 7 is the same as that in the computer 1, the data converting device 6 and the printer 7.

As shown in FIG. 4, at first, the output data Sb is generated in the computer 1 in order to print out an image, such as figure, document, and the like, by the printer 7 (Step 1).

Next, the generated output data Sb is transmitted to the data converting device 6 from the computer 1 though the switching device 5 (Step 2). The transmitted output data Sb is temporarily stored into the RAM 23 of the data converting device 6 (Step 3).

Next, in the computer 1, the display property data Sd of the display 15 of computer 1 is obtained, and the display property data Sd is stored into the RAM 14 of the computer 1 (Step 4). Here, the display property data Sd is data indicative of the display property of the display 15 installed in or connected with the computer 1. The display property includes resolution, the number of color, size of a screen, area of display and the like of a preview screen in the display 15.

Next, in the computer 1, it is determined whether or not an instruction to make a preview operation (steps 6 to 11) execute is inputted from the external though the input device 11 (Step 5). If the instruction is not inputted (Step 5; NO), the process proceeds to a step 12. On the other hand, if the instruction is inputted (Step 5; YES), the request signal Sr is generated, and is outputted to the data converting device 6 together with the display property data Sd stored in the RAM 14 (Step 6). Here, the request signal Sr is to require to transmit the preview data Sa to the computer 1 from the data converting device 6.

Next, in the data converting device 6, the require signal Sr and the display property data Sd are received (Step 7). In response to the request signal Sr, the preview data generating portion 26 generates the preview data Sa by using the display property data Sd received from the computer 1, the output data Sb stored in the RAM 23 and the converting data including the font data 30a and the converting rule data 30b stored in the converting data ROM 30 under a control of the CPU 22 (Step 8). The preview data Sa generated in this step can produce the preview image having fonts, relative size of characters, whole layout, positions of color and the like equal or similar to those of the actual image printed by the printer 7. Further, the preview data Sa generated in this step is very suitable for the display 15.

Next, the generated preview data Sa is transmitted to the computer 1 from the data converting device 6 (Step 9).

Next, in the computer 1, the preview data Sa is received, the preview image made from the preview data Sa is displayed on the display 15 (Step 11). Thus, a user can see the preview image equal or similar to the actual image printed by the printer 7.

Next, in the computer 1, after auxiliary information is inputted in order to set properties of printing (Step 12), an instruction data to make a printing operation start or cancel is transmitted to the data converting device 6 from the computer 1 (Step 13).

Next, in the data converting device 6, the instruction data is received (Step 14), and it is determined whether or not the instruction data instructs to start the printing operation (Step 15). If the instruction data instructs to start the printing operation (Step 15; YES), the bitmap data generating portion 25 converts the output data Sb stored in the RAM 23 into the print data (Step 16). Further, the print data is outputted to the printer 7, and the printer 7 prints out the image made from the print data (Step 17).

Next, after the printing operation is ended, the output data Sb stored in the RAM 23 is deleted (Step 18).

On the other hand, in the step 15, if the instruction data instructs to cancel the printing operation (Step 15; NO), the printing operation is canceled, and the output data Sb stored in the RAM 23 is deleted. Thus, the preview process is ended.

FIGS. 5A to 5C show examples of the request signal Sr and the display property data Sd, which are transmitted from the computer 1 to the data converting device 6 at the step 6 in the aforementioned preview process. FIG. 5A shows a protocol used for the communication between the computer 1 and the data converting device 6 when the request signal Sr and the display property data Sd are transmitted from computer 1 to the data converting device 6. FIG. 5B shows a content of the display property data Sd. FIG. 5C shows an actual data stream in which the request signal Sr and the display property data Sd shown in FIG. 5B are arranged according to the protocol shown in FIG. 5A. In addition, the data stream shown in FIG. 5C is formed in accordance with the so called "http" protocol used for communication of internet.

In FIG. 5A, "Preview Generating Command URL" positioned at the head of the data stream means a request to transmit the preview data Sa to the computer 1 from the data converting device 6. Namely, this is the request signal Sr. The next data is information representing the resolution, the next data is information representing the number of color, and the next data is information representing a size of a preview screen. Such a data stream is transmitted from the computer 1 to the data converting device 6 at the step 6.

More concretely, as shown in FIG. 5C, "HTTP://www.printserv1.sample.co.jp/preview/getpreview.exe" is the URL, "120 dpi" means that the resolution is 120 dot per inch, "256" means that the number of color is 256, and "32,32" means that the size of the preview screen is 32 [mm]×32 [mm]. Such a data stream is concretely transmitted from the computer 1 to the data converting device 6 at the step 6.

In the data converting device 6. since the preview data Sa is generated by using such a data stream, the preview data Sa very suitable for the display 15 of the computer 1 can be generated. Therefore, a preview image made from the preview data Sa is equal or similar to the actual image printed by the printer 7.

Moreover, a preview image based on the output data Sb generated in the computer 1 can be displayed on the display 15 of the computer 2. In this case, at least steps 4, 5, 6, 10 and 11 are carried out in the computer 2. Further, in this case, the request signal Sr and the display property data Sd are transmitted from the computer 2, and the display property data Sd has the display property of the display 15 of the computer 2, and then, the data converting device 6 transmits the preview data Sa suitable for the display 15 of the computer 2 to the computer 2.

As mentioned above, the preview process in the each of the computers 2 to 3, the data converting device 6 and the printer 7 is the same as that in the computer 1, the data converting device 6 and the printer 7.

Here, in case that the display property of the display 15 installed in or connected with each computer 1 to 4 is different, the content of the display property data Sd transmitted from each computer 1 to 4 is also different. Accordingly, when the preview data Sa is generated by using the display property data Sd transmitted form the computer 2, the preview data Sa is very suitable for the display 15 of the computer 2. On the other hand, when the preview data Sa is generated by using the display property data Sd transmitted form the computer 3, the preview data Sa is very suitable for the display 15 of the computer 3.

For example, as shown in FIG. 6, when the display property data Sd transmitted from the computer 1 indicates that: resolution is 120 dpi; the number of color is 256 (8 bit index color); and size of the preview screen is 50 [mm]×50 [mm], the preview data Sa corresponding to a preview image having 236 pixels×263 pixels and 256 colors is generated.

Further, when the display property data Sd transmitted from the computer 2 indicates that: resolution is 72 dpi; the number of color is 16,777,216 (8 bit red color, 8 bit green color and 8 bit blue color); and size of the preview screen is 65 [mm]×65 [mm], the preview data Sa corresponding to a preview image having 184 pixels×184 pixels and 16,777,216 colors is generated.

Furthermore, when the display property data Sd transmitted from the computer 3 indicates that: resolution is 120 dpi; the number of color 32,768 (5 bit red color, 5 bit green color and 5 bit blue color); and size of the preview screen is 50 [mm]×50 [mm], the preview data Sa corresponding to a preview image having 236 pixels×236 pixels and 32,768 colors is generated.

As explained above, according to the network system W1 of the first embodiment, when the request signal Sr is transmitted from each computer 1 to 4, the preview data Sa to be used for the preview is generated by using the converting data and the output data Sb in the data converting device 6. Therefore, the preview image made from the preview data Sa can be completely equal or similar to the actual image printed by the printer 7.

Namely, according to the first embodiment, the preview data Sa is not generated by using font data, etc. stored in each computer 1 to 4 itself, but the preview data Sa is generated by using font data, etc. included in the converting data stored in the convert data ROM 30 of the data converting device 6. Namely, the preview data Sa is generated by using the same process and the same converting data as that used for generating the print data. Therefore, the preview image made from the preview data Sa can be equal or similar to the actual image made from the print data. That is to say, the preview image can be equal or similar to the actual image printed by the printer 7. Thus, a user can correctly know the content and the condition of the image to be printed out by looking at the preview image before the user actually prints out the image.

Further, according to the first embodiment, the preview data Sa is generated by further using the display property data Sd. Therefore, the preview data Sa very suitable for the display property of the display 15 of each computer 1 to 4 can be generated. Accordingly, the preview image made from the preview data Sa is very clear and is not broken. For example, all lines, all figures and all characters in the preview image are very clear.

Furthermore, since the display property data Sd is transmitted to the data converting device 6 together with the request signal Sr, the display property data Sd is transmitted only when a necessity arises. Accordingly, a work load of the data converting device 6 can be reduced.

Moreover, since the display property data Sd transmitted from each computer 1 to 4 includes information of resolution, the number of color and size of a preview screen, the preview data Sa very suitable for each display can be generated.

II. Second Embodiment

Secondly, a second embodiment of the present invention will be explained. Compared with the network system W1 of the first embodiment, the feature of the network system of the second embodiment is that the display property data Sd is transmitted together with the output data Sb. In addition, as the configuration of a network system of the second embodiment is the same as that of the network system W1 of the first embodiment, explanation about the configuration of the network system of the second embodiment is omitted.

FIG. 7 is a flowchart showing the preview process in the network system of the second embodiment. As shown in FIG. 7, like the step I of the preview process in the first embodiment, the output data Sb is generated in the computer 1 at first (Step 21).

Next, in the computer 1, the display property data Sd is obtained, and the generated output data Sb is transmitted to the data converting device 6 together with the display property data Sd (Step 22). In addition, like the display property data in the first embodiment, information with respect to the display property of the display 15 of the computer 1 are included in the display property data Sd in the second embodiment.

Next, in the data converting device 6, the received output data Sb and the received display property data Sd are temporality stored into the RAM 23 (Step 23).

Next, in the computer 1, it is determined whether or not an instruction to make the preview operation (steps 25 to 30) execute is inputted from the external though the input device 11 (Step 24). If the instruction is not inputted (Step 24; NO), the process proceeds to a step 31. On the other hand, if the instruction is inputted (Step 24; YES), the request signal Sr is generated, and is outputted to the data converting device 6 (Step 25).

Next, the request signal Sr is received in the data converting device 6 (Step 26). Thereafter, the steps 27 to 38 are performed. The steps to 27 to 38 are the same as the steps 8 to 19 in the first embodiment.

FIGS. 8A and 8B show examples of the display property data Sd transmitted together with the output data Sb at the step 22. FIG. 8A shows an example of a format of the display property data, and FIG. 8B shows an example of an actual data stream of the display property data Sd including concrete values. The data stream shown in FIG. 8B is described on the basis of a "Post Script" format.

As shown in FIG. 8A, the display property data Sd includes information of resolution, a identification flag representing an attribute of color, information representing the number of color and information representing size of a preview screen.

In a case that resolution is 120 dpi, an attribute of color is RGB type, the number of color is 32,768 and size of a preview screen is 50 [mm]×50 [mm], the display property data Sd shown in FIG. 8B is generated.

As explained above, according to the network system of the second embodiment, the preview image produced by the preview data Sa can be completely equal or similar to the actual image printed by the printer 7, and further, it is possible to make the preview image very clear.

III. Third Embodiment (i) Configuration of Network System

Figure 9:
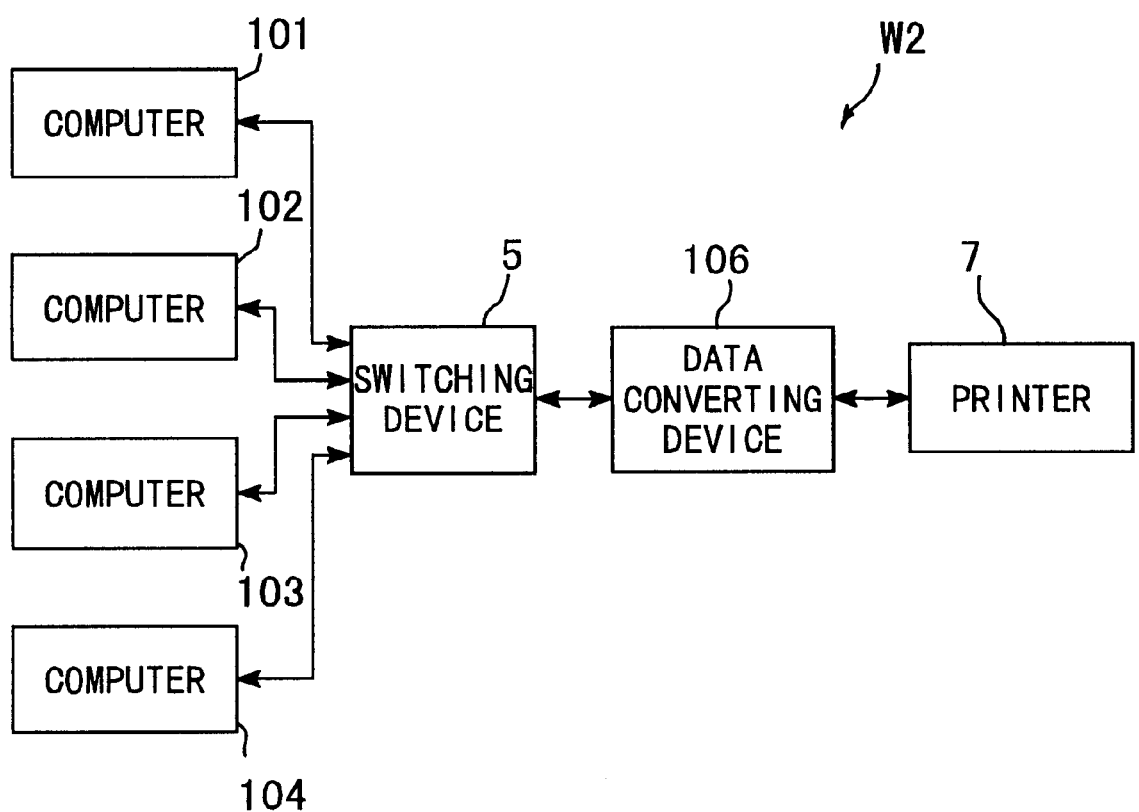
FIG. 9 is a block diagram showing a configuration of a network system of a third embodiment of the present invention.
Figure 10:
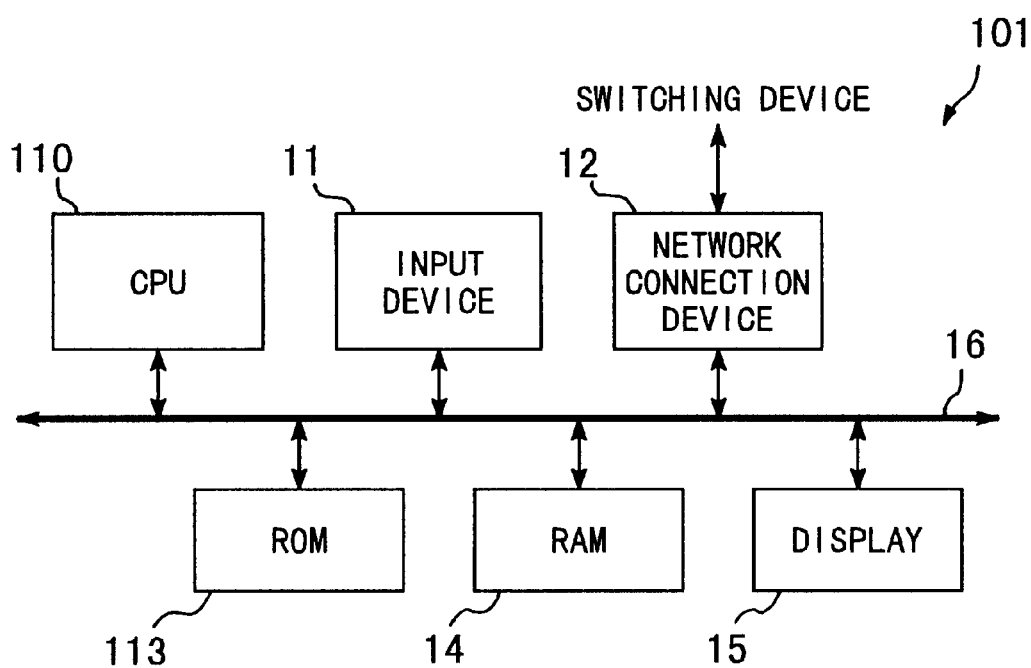
FIG. 10 is a block diagram showing a configuration of a computer according to the third embodiment of the present invention.
Figure 11:
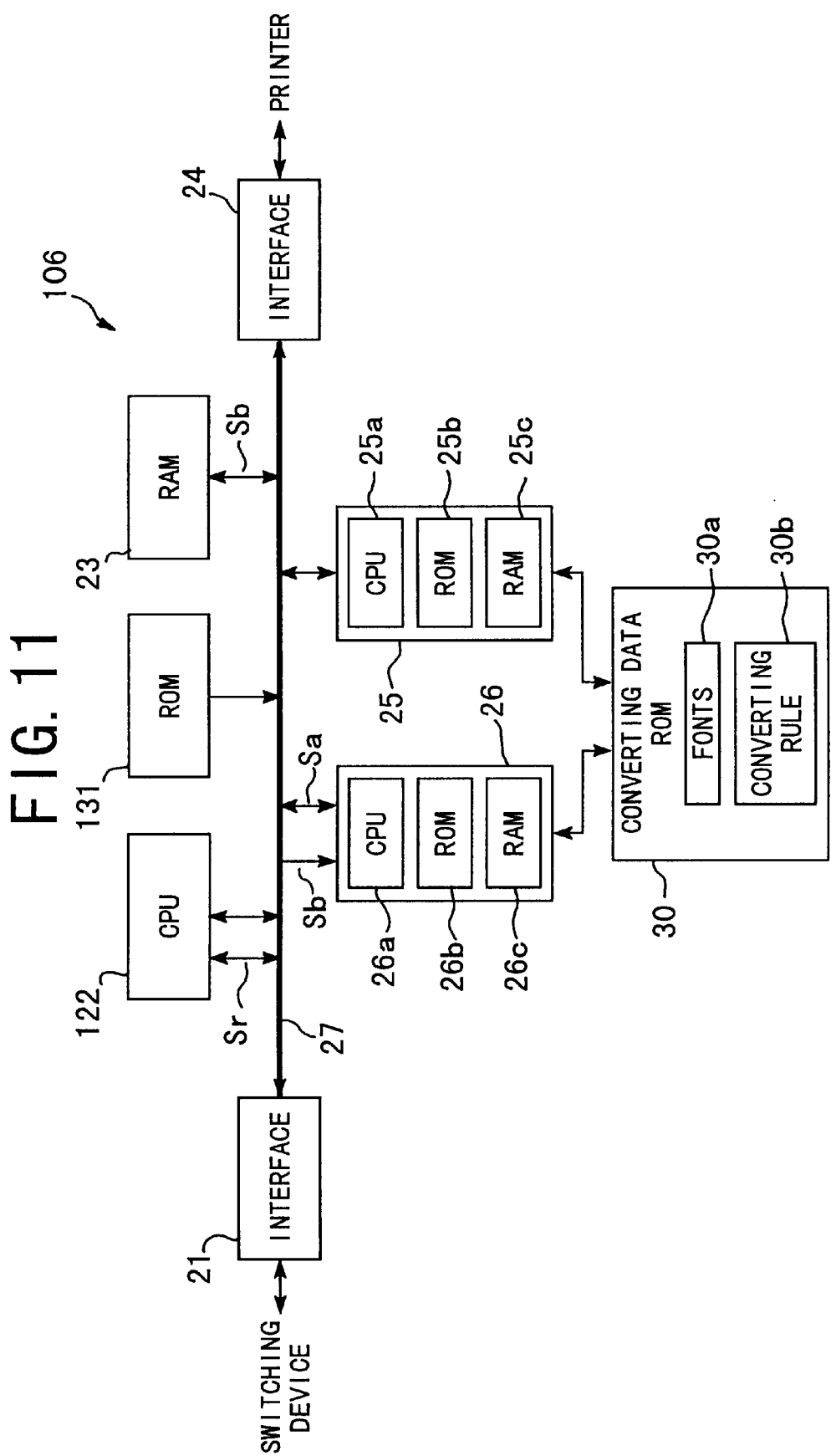
FIG. 11 is a block diagram showing a configuration of a data converting device according to the third embodiment of the present invention.

Thirdly, a third embodiment of the present invention will be explained. Compared with the network system W1 of the first embodiment, the feature of the network system W2 of the third embodiment is that the a trimming process and a tiling process are carried out in the preview process. In FIGS. 9 to 11, the same constructional elements as those in FIGS. 1, 2A and 3 carry the same reference numbers, and explanations thereof are omitted.

FIG. 9 shows the configuration of a network system W2 as an third embodiment of the present invention. Like the network system W1 of the first embodiment, the network system W2 has four computers 101 to 104, a data converting device 106, a switching device 5 and a printer 7.

Each computer 101 to 104 generates output data Sb by using an application software, etc. in order to print out an image by the printer 7, and outputs the output data Sb. Further, each computer 101 to 104 carries out a preview process together with the data converting device 106 and the printer 7. Furthermore, each computer 101 to 104 performs a trimming process and a tiling process.

The data converting device 106 receives the output data Sb from each computer 101 to 104 through the switching device 5, converts the received output data Sb into print data of a bitmap format by using converting data installed in the data converting device 106, and outputs the print data to the printer 7. Further, the data converting device 106 carries out the preview process together with the computers 101 to 104 and the printer 7. Furthermore, when converting the output data Sb into the print data, the data converting device 106 processes the output data Sb on the basis of processing data Se received from each computer 101 to 104. The processing data Se is generated by the trimming process or the tiling process in each computer 101 to 104.

FIG. 10 shows the configuration of each computer 101 to 104. As each computer 101 to 104 has the same configuration, the configuration and the operation of the computer 101 will be explained.

As shown in FIG. 10, the computer 101 has a CPU 110, an input device 11, a network connection device 12, a ROM (Read Only Memory) 113, RAM (Random Access Memory) 14, a display 15. Theses devices are connected with each other through a bus 16.

The ROM 113 is a memory for storing programs for carrying out the preview process, the trimming process and the tiling process, and further storing programs for controlling the computer 101.

The CPU 110 performs word processing, picture processing, control of computer 101, etc. in accordance with the programs stored in the ROM 113 and the application program stored in the RAM 14. Further, the CPU 110 performs the trimming process and the tiling process according to the programs stored in the ROM 113.

Further, when the trimming process or the tiling process is carried out, the input device II is used for inputs of trimming areas or dividing lines, and the display 15 is used for displaying the inputted trimming areas or the inputted dividing lines.

Next, FIG. 11 shows the configuration of the data converting device 106. The data converting device 106 has interfaces 21, 24, a CPU 122, a ROM 131, a RAM 23, a bitmap data generating portion 25, a preview data generating portion 26, and a converting data ROM 30. These devices and portions are connected with each other though a bus 27.

The CPU 122 controls the devices and portions installed in the data converting device 106, and outputs the preview data Sa to each computers 101 to 104 though the switching device 5. Further, the CPU 122 processes the output data Sb on the basis of the processing data Se transmitted from each computer 101 to 104. Namely, when the processing data Se is received, the CPU 122 controls the bitmap data generating portion 25, and the bitmap data generating portion 25 processes the output data Sb on the basis of the processing data Se under a control of the CPU 122. Thereafter, the bitmap data generating portion 25 converts the output data Sb into the print data of the bitmap format.

The ROM 131 is a memory for storing control programs for controlling the devices and portions installed in the data converting device 106 and programs used for processing the output data Sb on the basis of the processing data Se.

(ii) Preview Process

Figure 12:
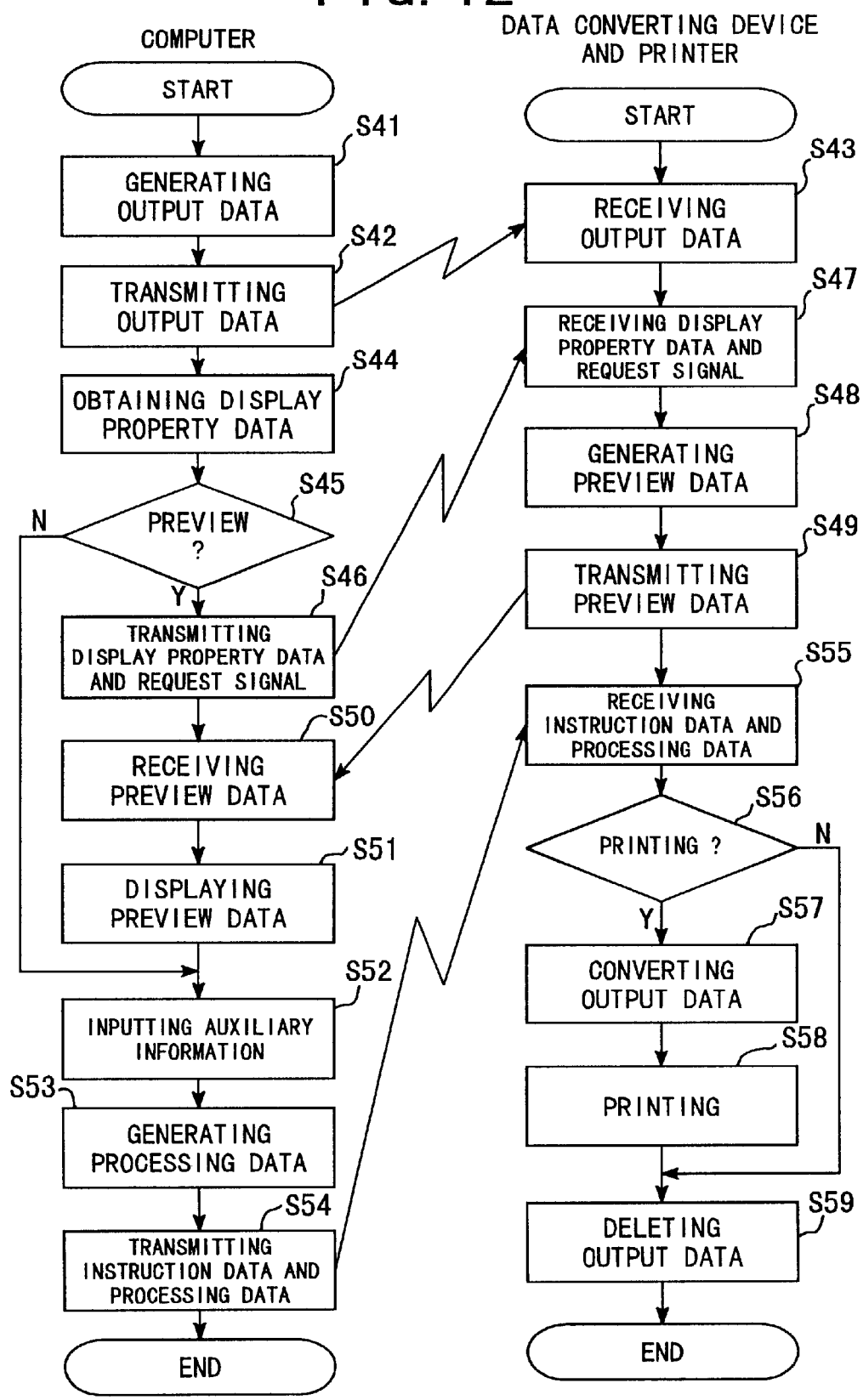
FIG. 12 is a flowchart showing a preview process according to the third embodiment of the present invention.

FIG. 12 is a flowchart showing the preview process in the computer 101, the data converting device 106 and the printer 7. In addition, the preview process in the each of the computers 102 to 103, the data converting device 106 and the printer 7 is the same as that in the computer 101, the data converting device 106 and the printer 7.

As shown in FIG. 12, like the steps 1 to 12 in the preview process of the first embodiment, the steps 41 to 52 are performed.

Figure 17:
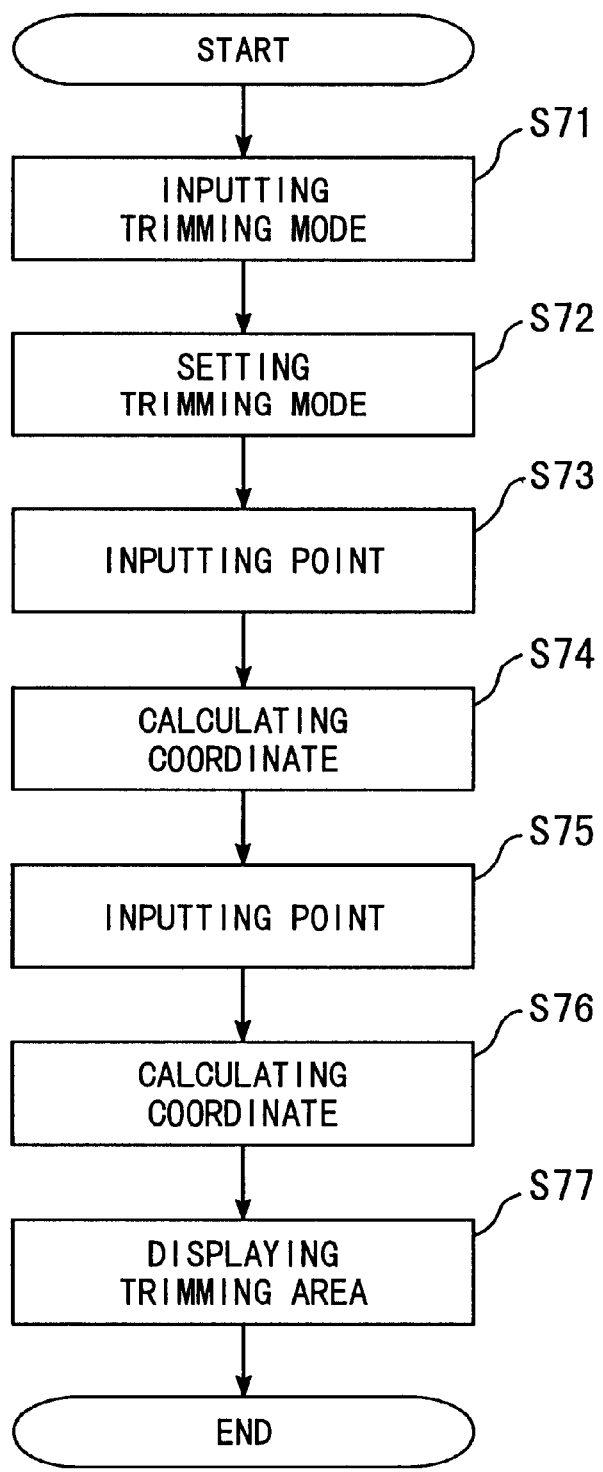
FIG. 17 is a flowchart showing a trimming process according to the third embodiment of the present invention.
Figure 18:
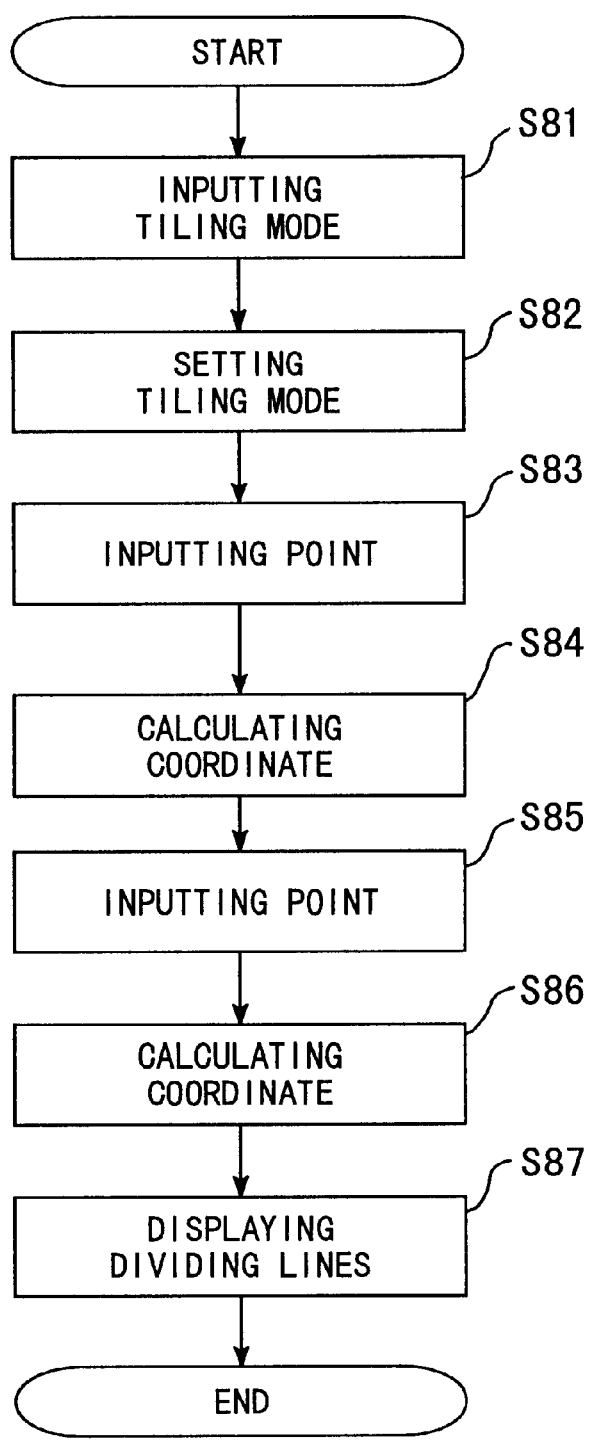
FIG. 18 is a flowchart showing a tiling process according to the third embodiment of the present invention.

Next, in a step 53, either or both of the trimming process shown in FIG. 17 and the tiling process shown in FIG. 18 is (are) carried out in the computer 101. the processing data Se is generated in this step.

Next, an instruction data to make a printing operation start or cancel is transmitted to the data converting device 106 from the computer 101 (Step 54). In this step, the processing data Se is transmitted to the data converting device 106 together with the instruction data.

Next, in the data converting device 106, the instruction data and the processing data Se are received (Step 55), and it is determined whether or not the instruction data instructs to start the printing operation (Step 56). If the instruction data instructs to start the printing operation (Step 56; YES), the bitmap data generating portion 25 processes the output data Sb stored in the RAM 23 on the basis of the received processing data Se, and converts the output data Sb into the print data (Step 57). Further, the data converting device 106 outputs the print data to the printer 7. Then, the printer 7 prints out an image made from the print data (Step 58).

Next, after the printing operation is ended, the output data Sb stored in the RAM 23 is deleted (Step 59).

On the other hand, in the step 55, if the instruction data instructs to cancel the printing operation (Step 56; NO), the printing operation is canceled, and the output data Sb stored in the RAM 23 is deleted. Thus, the preview process is ended.

(iii) Trimming Process and Tiling Process

The trimming process and the tiling process are carried out at the steps 53 and 57 in the preview process. Namely, in the step 53, data necessary to the trimming process and the tiling process, i.e., the processing data Se is generated in each computer 101 to 104 according to inputs from external, and, in the step 57, the output data Sb is processed on the basis of the processing data Se in the data converting device 106.

Figure 13:
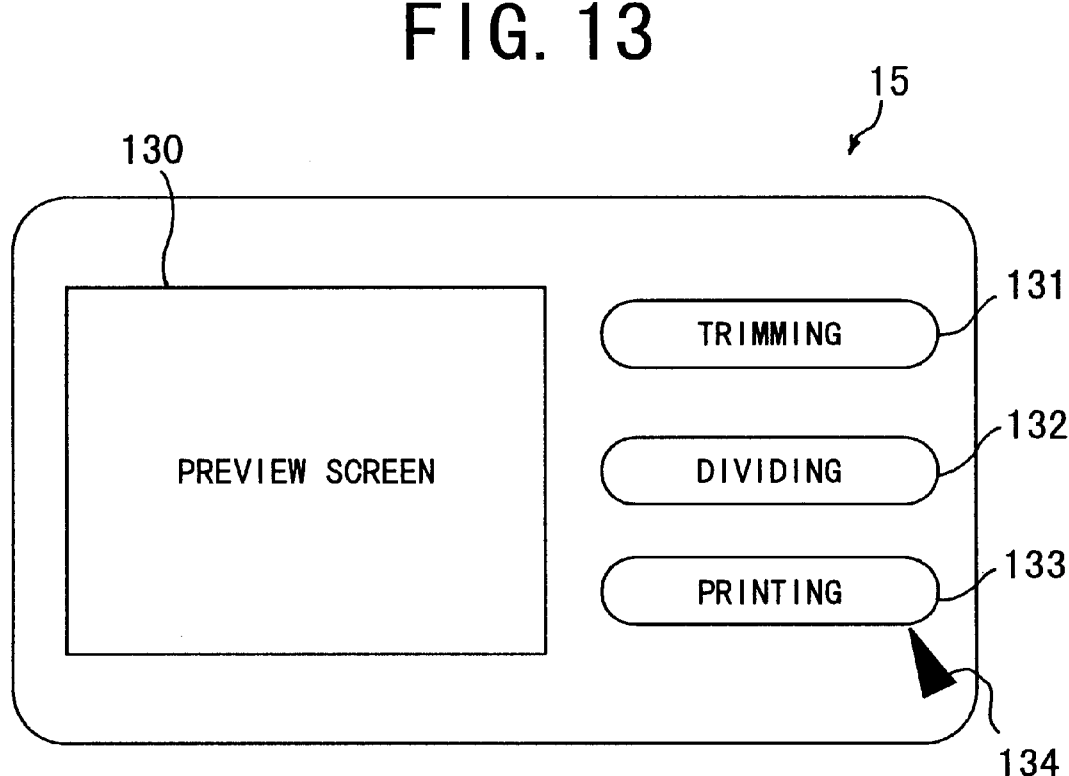
FIG. 13 is a diagram showing a preview screen according to the third embodiment of the present invention.

FIGS. 13 to 16 show examples of a screen of display 15 when the trimming process and the tiling process are carried out. As shown in FIG. 13, a display portion 130, a trimming mode input button 131, a dividing mode input button 132, a print execution button 133 and mouse cursor 134 shaped like an arrow are positioned in the screen. The display portion 130 is a preview screen to display simultaneously a preview image made from the preview data Sa, trimming areas representing peripheral portions of the image to be deleted, and dividing lines representing dividing portions of the image. The trimming mode input button 131 is a switch to input trimming areas. The dividing mode input button 132 is a switch to input the dividing line. The printing execution button 133 is a switch to input the instruction to make the printing operation start.

The mouse cursor 134 is moved within the screen according to the mouse of the input device 11. When the mouse cursor 134 is positioned on the button and an input switch attached to the mouse is pushed, a process assigned to the button is carried out by the CPU 110.

FIG. 17 a flowchart showing the trimming process. As shown in FIG. 17, the mouse cursor 134 is moved on the trimming mode input button 131, and the switch attached to the mouse is pushed (Step 71). Then, the trimming process mode is set in the computer 101, and the trimming process is started in the computer 101 (Step 72).

Figure 14:
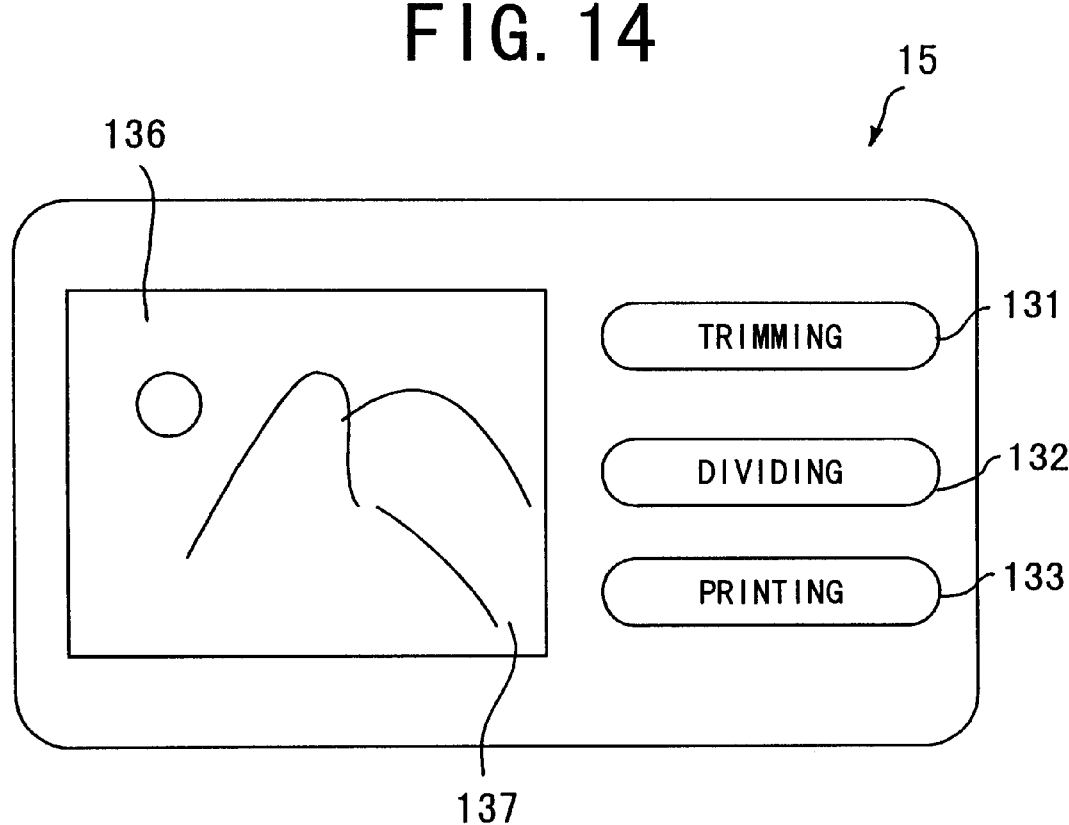
FIG. 14 is a diagram showing a preview screen displaying a preview image according to the third embodiment of the present invention.

Next, the mouse cursor 134 is moved on a point 136 in the screen shown in FIG. 14, and the switch attached to the mouse is pushed (Step 73). As a result, the CPU 110 calculates a coordinate of the point 136 on the basis of a relationship between the preview image and the position of the mouse cursor 134, and stores it in the RAM 14 (Step 74).

Figure 15:
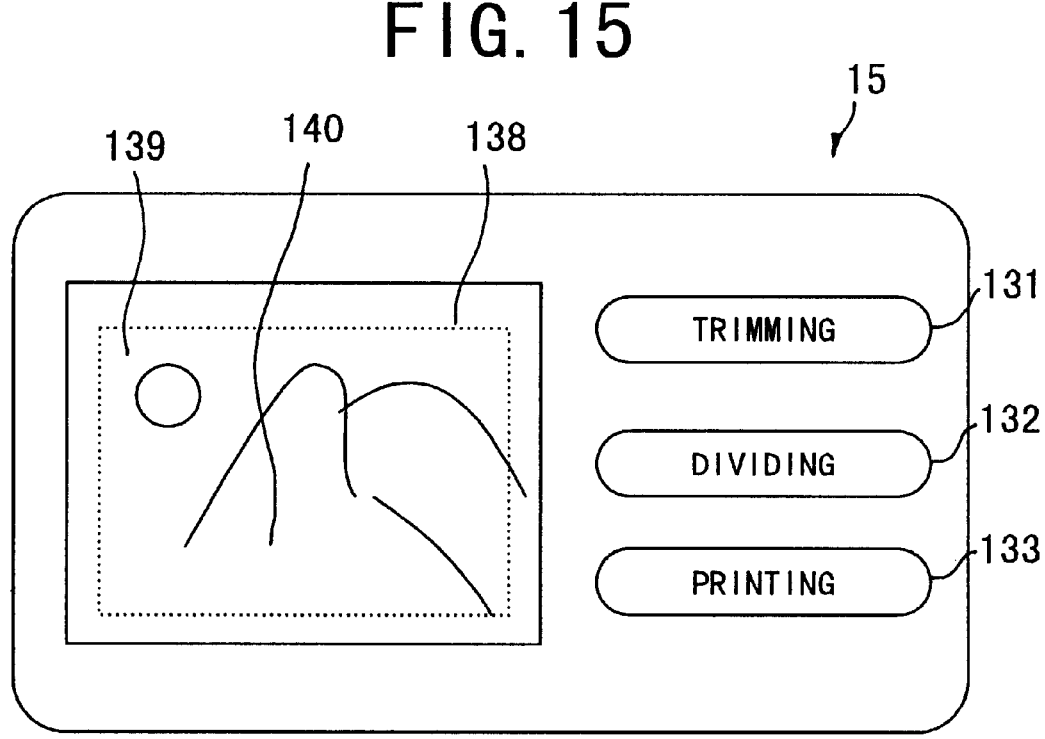
FIG. 15 is a diagram showing a preview screen displaying a trimming area according to the third embodiment of the present invention.
Figure 16:
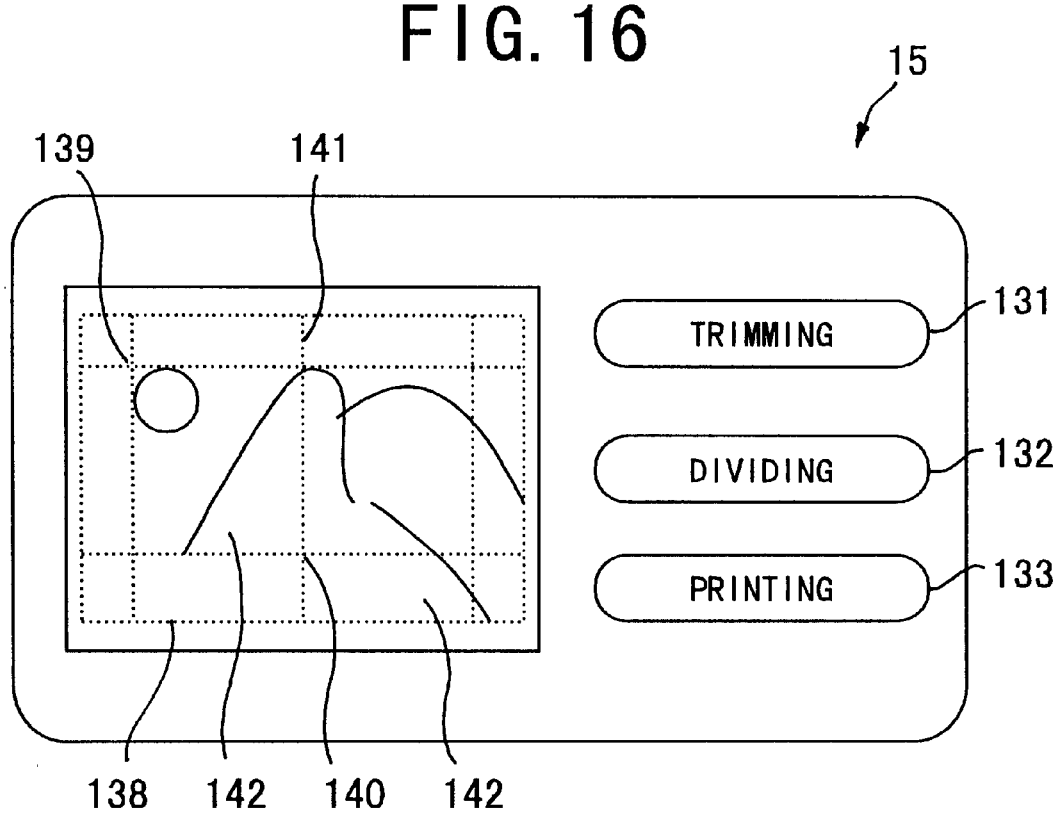
FIG. 16 is a diagram showing a preview screen displaying dividing lines according to the third embodiment of the present invention.

Next, the mouse cursor 134 is moved on a point 137 in the screen shown in FIG. 15, and the switch attached to the mouse is pushed Step 75). As a result, the CPU 110 calculates a coordinate of the point 137, and stores it in the RAM 14 (Step 76). Thus, the coordinates of the points 136 and 137 are stored as the processing data Se. Further, as shown in FIG. 15, the CPU 110 displays a quadrangle of dot line including the points 36 and 37 as its apexes positioned on its diagonal in the display portion 130 in order to represent the trimming area (Step 77).

FIG. 18 a flowchart showing the tiling process. As shown in FIG. 18, the mouse cursor 134 is moved on the tiling mode input button 132, and the switch attached to the mouse is pushed (Step 81). Then, the tiling process mode is set in the computer 101, and the tiling process is started in the computer 101 (Step 82).

Next, the mouse cursor 134 is moved on a point 139 in the screen shown in FIG. 15, and the switch attached to the mouse is pushed (Step 83). As a result, the CPU 110 calculates a coordinate of the point 139 on the basis of a relationship between the preview image and the position of the mouse cursor 134, and stores it in the RAM 14 (Step 84). Further, the mouse cursor 134 is moved on a point 140, and the switch attached to the mouse is pushed (Step 85). Then, the CPU 110 calculates a coordinates of the point 140, and stores it in the RAM 14 (Step 86). Thus, the coordinates of the points 139 and 140 are stored as the processing data Se. At this time, the coordinates of the points 139 and 140 are calculated such that a dividing line formed by the points 139 and 140 is not passed though important parts of the image.

Further, dividing lines 141 are displayed in the display portion 130 on the basis of the points 139 and 140, and divided areas 142 are formed in the display portion 130 (Step 87). Namely, when one dividing area 142 is decided by the points 139 and 140, the other dividing areas 142 are automatically formed at the upper side, the under side, the right side and the left side of the dividing area 142 decided by the points 139 and 140 in the display portion 130.

After the trimming process and tiling process are carried out in the computer 101, the mouse cursor 134 is moved on the print execution button 133, and the switch attached to the mouse is pushed. Then, the CPU 110 transmits the processing data Se stored in the RAM 14 to the data converting device 106 together with the instruction data to make the printing operation start (Step 54).

Next, in the data converting device 106, when the processing data Se and the instruction data are received (Step 55) and the instruction data instructs to make the print operation start (Step 56; YES), the CPU 122 carries out the trimming. That is, the output data Sb is processed on the basis of the coordinates of the points 136 and 137 included in the processing data Se (i.e., the peripheral portion of the image corresponding to the output data Sb is deleted on the basis of the coordinates of the points 136 and 137.). Further, the CPU 122 carries out the tiling. That is, the output data Sb is processed on the basis of the coordinates of the points 139 and 140. For example, an image corresponding to the output data Sb is divided on the basis of the coordinates of the points 139 and 140, and then, a maximum magnification in the range that an area of rectangle having the points 139 and 140 as its apexes positioned on its diagonal does not exceed the printing area of a print engine 20 is calculated, and then, the divide image is enlarged by the calculated magnification, and then, the print data is generated. Further, the print data is supplied to the print engine 20 though the interface 24, the network connection device 17 and bus 21, and then, the divided images are continuously printed. Thus, if a user puts plural sheet of paper printed each divided image in order and connects these, the image corresponding to the output data Sb is obtained.

As explained above, according to the network system W2 of the third embodiment, the preview image made from the preview data Sa can be completely equal or similar to the actual image printed by the printer 7, and further, it is possible to make the preview image very clear. Thus, since a user can inputs coordinate data (e.g. the points 136, 137, 139, 140, etc.) in the trimming process and the tiling process on the basis of the preview image completely equal or similar to the actual image, the user can correctly input the coordinate data. Further, since the trimming process and the tiling process are carried out on the basis the preview data Sa generated by using the same process and the same converting data as those used for generating the print data, these processes can be correctly carried out in each computer 101 to 104, and the process of the output data Sb can be correctly carried out in the data converting device 106.

In addition, in the aforementioned third embodiment, the coordinate data are inputted by the mouse of the input device 11. Additionally, the coordinate data can be inputted by the keyboard of the input device 11. Further, a tablet or a light pen can be also used for the input of the coordinate data. Moreover, an external storage device may be installed in each computer 101 to 104 in order to store the generated image, trimming areas, dividing positions.

Further, at the step 53 in the preview process of the third embodiment, a color correction process may be carried out. An error diffusion method or a dither method is used in the color correction process. In this case, when a user inputs data to correct color of the image, the processing data Se is generated on the basis of the input data in each computer 101 to 104, and then, the print data is generate on the basis of the processing data Se in the data converting device 106.

In this case, the processing data Se is data to correct color of the actual image printed by the printer 7. Since color of the preview image is equal or similar to the actual image, a user can correctly do color correction.

Furthermore, at the step 53 in the preview process of the third embodiment, a change of size may be carried out. In this case, when a user inputs data to reduce the image size, for example ½, ⅓ or the like, the processing data Se is generated on the basis of the input data in each computer 101 to 104, and then, the print data is generate on the basis of the processing data Se in the data converting device 106.

In this case, the processing data Se is data to reduce size of the actual image printed by the printer 7. Since the preview image is equal or similar to the actual image, a user can correctly do a change of size.

In addition, the present invention may be adapted to a printer having the data converting function equal to the data converting device 6. For example, the present invention may be adapted to a printer having a RIP (Raster Image Processor) program to convert the output data Sb into the bitmap data.

Further, the present invention may be adapted to a TV conference system. If the present invention is adapted to the TV conference system, a participant in the conference can confirm images to be used for the conference before the participant actually displays the images.

Furthermore, the preview process may be performed by using a program of the preview process shown in FIG. 4, 7 or 12 recorded on a program storage device or recording medium, such as an optical disc, a floppy or flexible disc and so on. In this case, in each computer 1 to 4 (101 to 104), the program of the preview process is read by an optical disc driver, floppy disc driver or the like, and the read program is stored in the RAM 14, for example, a hard disc. The CPU 10 (110) performs the preview process by reading the program stored in the RAM 14. Further, in the data converting device 6 (106), the program of the preview process is read by an optical disc driver, floppy disc driver or the like, and the read program is stored in the RAM 23. The CPU 22 (122) performs the preview process by reading the program stored in the RAM 23.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image output system having a preview function for displaying a preview image corresponding to an output image before the output image is outputted, the image output system comprising:
   at least one output data generating apparatus comprising:
      an output data generating device that generates output data;
      an output data sending device that sends the generated output data to a converting apparatus;
      a preview data receiving device that receives preview data from the converting apparatus; and
      a display device that displays a preview image made from the received preview data,
   the converting apparatus comprising:
      an output data receiving device that receives the output data from the output data generating apparatus;
      a converting device that converts the received output data into data suitable for an output apparatus by using converting data which includes predetermined data necessary to a process for converting;
      a preview data generating device that generates the preview data by using the received output data and the converting data; and
      a preview data sending device that sends the generated preview data to the output data generating apparatus; and
   the output apparatus outputs the output image, the output image being made from the output data converted by the converting device.

2. An image output system according to claim 1, wherein
   the output data generating apparatus further comprises a request signal sending device that sends a request signal to request the preview data to the converting apparatus,
   the converting apparatus further comprises a request signal receiving device that receives the request signal from the output data generating apparatus, and
   the preview data sending device sends the generated preview data to the output data generating apparatus when the request signal receiving device receives the request signal.

3. An image output system according to claim 1, wherein the converting data includes at least one of (1) converting rule data for interpreting command codes included in the output data and (2) font data corresponding to characters included in the output data.

4. An image output system according to claim 1, wherein
   the converting apparatus further comprises a memory device that stores the converting data, and
   the converting device and the preview data generating device share the converting data stored in the memory device.

5. An image output system according to claim 2, wherein
   the output data generating apparatus further comprises a display property data sending device that sends display property data of a display property of the display device to the converting apparatus,
   the converting apparatus further comprises a display property data receiving device that receives the display property data from the output data generating apparatus, and the preview data generating device generates the preview data by using the output data, the converting data and the received display property data.

6. An image output system according to claim 5, wherein the display property data includes at least one of (1) resolution, (2) number of colors, and (3) size of display.

7. An image output system according to claim 5, wherein the display property data sending device sends the display property data together with the request signal sent by the request signal sending device.

8. An image output system according to claim 5, wherein the display property data sending device sends the display property data together with the output data sent by the output data sending device.

9. An image output system according to claim 6, wherein the output data generating apparatus further comprises:
   a processing data generating device that generates processing data, which is used for processing the output data, on the basis of the received preview data; and
   a processing data sending device that sends the generated processing data to the converting apparatus,
   the converting apparatus further comprises a processing data receiving device that receives the processing data from the output data generating apparatus, and
   the converting device processes the received output data by using the received processing data and converts the processed output data into the data suitable for the output apparatus.

10. An image output system according to claim 6, wherein the converting data includes at least one of (1) converting rule data for interpreting command codes included in the output data and (2) font data corresponding to characters included in the output data,
    the converting apparatus further comprises a memory device that stores the converting data, and
    the converting device and the preview data generating device share the converting data stored in the memory device.

11. An image output system according to claim 9, wherein the processing data includes at least one of (1) trimming data used for a trimming process, (2) dividing data to set a position to divide the output image, (3) color correction data to correct colors of the output image, and (4) size data to change a size of the output image.

12. A method of displaying a preview image corresponding to an output image in an image output system comprising at least one output data generating apparatus that generates output data and displays the preview image on a display device, a converting apparatus that converts the output data into data suitable for an output apparatus by using converting data, which includes predetermined data necessary to a process for converting, and an output apparatus that outputs the output image, the output image being made from the converted output data, said method comprising the processes of:
    generating the output data in the output data generating apparatus;
    sending the output data generated in the output data generating apparatus to the converting apparatus;
    receiving the output data from the output data generating apparatus in the converting apparatus;
    generating preview data by using the received output data and the converting data in the converting apparatus;
    sending the preview data generated in the converting apparatus to the output data generating apparatus;
    receiving the preview data from the converting apparatus in the output data generating apparatus; and
    displaying the preview image made from the received preview data on the display device of the output data generating apparatus.

13. A method according to claim 12, further comprising the processes of:
    sending the output data generated in the output data generating apparatus and display property data of a display property of the display device of the output data generating apparatus to the converting apparatus;
    receiving the output data and the display property data from the output data generating apparatus in the converting apparatus; and
    generating preview data by using the received output data, the converting data and the received display property data in the converting apparatus.

14. A method according to claim 12, wherein the converting data includes at least one of (1) converting rule data for interpreting command codes included in the output data and (2) font data corresponding to characters included in the output data, and
    wherein the method further comprises the processes of:
       storing the converting data in a memory device of the converting apparatus, and
       sharing the converting data, which is stored in the memory device, in the converting device and the preview data generating device.

15. A method according to claim 13, wherein the display property data includes at least one of (1) resolution, (2) number of colors, and (3) size of display.

16. A method according to claim 15, further comprising the processes of:
    generating processing data, which is used for processing the output data, on the basis of the received preview data in the output data generating apparatus, after the preview image is displayed in the displaying process;
    sending the processing data generated in the output data generating apparatus to the converting apparatus;
    receiving the processing data from the output data generating apparatus in the converting apparatus;
    processing the received output data by using the received processing data and converting the processed output data into the data suitable for the output apparatus in the converting apparatus; and
    outputting the converted output data in the output apparatus.

17. A method according to claim 16, wherein the processing data includes at least one of (1) trimming data used for a trimming process, (2) dividing data to set a position to divide the output image, (3) color correction data to correct colors of the output image, and (4) size data to change a size of the output image.

18. A method according to claim 16, wherein the converting data includes at least one of (1) converting rule data for interpreting command codes included in the output data and (2) font data corresponding to characters included in the output data, and
    wherein the method further comprises the processes of:
       storing the converting data in a memory device of the converting apparatus, and
       sharing the converting data, which is stored in the memory device, in the converting device and the preview data generating device.

19. A program storage device readable by a first computer included in at least one output data generating apparatus and a second computer included in a converting apparatus in an image output system comprising the output data generating apparatus that generates output data and displays a preview image on a display device, the converting apparatus converting the output data into data suitable for an output apparatus by using converting data, which includes predetermined data necessary to a process for converting, and the output apparatus outputting an output image made from the converted output data, tangibly embodying a program of instructions executable by the first computer and the second computer to perform method processes for displaying the preview image corresponding to the output image in the image output system, the method processes comprising:

generating the output data in the output data generating apparatus;

sending the output data generated in the output data generating apparatus to the converting apparatus;

receiving the output data from the output data generating apparatus in the converting apparatus;

generating preview data by using the received output data and the converting data in the converting apparatus;

sending the preview data generated in the converting apparatus to the output data generating apparatus;

receiving the preview data from the converting apparatus in the output data generating apparatus; and displaying the preview image made from the received preview data on the display device of the output data generating apparatus.

20. A program storage device according to claim 19, wherein the method processes further comprise:

sending the output data generated in the output data generating apparatus and display property data of a display property of the display device of the output data generating apparatus to the converting apparatus;

receiving the output data and the display property data from the output data generating apparatus in the converting apparatus; and generating preview data by using the received output data, the converting data and the received display property data in the converting apparatus.

21. A program storage device according to claim 20, wherein the method processes further comprise:

generating processing data, which is used for processing the output data, on the basis of the received preview data in the output data generating apparatus, after the preview image is displayed in the displaying process;

sending the processing data generated in the output data generating apparatus to the converting apparatus;

receiving the processing data from the output data generating apparatus in the converting apparatus;

processing the received output data by using the received processing data and converting the processed output data into the data suitable for the output apparatus in the converting apparatus; and outputting the converted output data in the output apparatus.

22. A program storage device according to claim 21, wherein the converting data includes at least one of (1) converting rule data for interpreting command codes included in the output data and (2) font data corresponding to characters included in the output data, and wherein the method processes further comprise:

storing the converting data in a memory device of the converting apparatus, and sharing the converting data, which is stored in the memory device, in the converting device and the preview data generating device.

* * * * *